United States Patent
Huang et al.

(10) Patent No.: US 11,361,023 B2
(45) Date of Patent: Jun. 14, 2022

(54) RETRIEVAL AND CONVERSION OF QUERY RESULTS FROM MULTIPLE QUERY SERVICES

(71) Applicant: SAP SE, Walldorf (DE)

(72) Inventors: Lei Huang, Shanghai (CN); Haibin Yuan, Shanghai (CN); Ting Wang, Shanghai (CN); Guoliang Li, Shanghai (CN); Zhiqian Ding, Shanghai (CN); Wenchang Zhang, Shanghai (CN); Lin Zhao, Shanghai (CN); Lishi Shen, Shanghai (CN); Sai Wu, Shanghai (CN)

(73) Assignee: SAP SE, Walldorf (DE)

( * ) Notice: Subject to any disclaimer, the term of this patent is extended or adjusted under 35 U.S.C. 154(b) by 354 days.

(21) Appl. No.: 16/503,370

(22) Filed: Jul. 3, 2019

(65) Prior Publication Data
US 2021/0004407 A1  Jan. 7, 2021

(51) Int. Cl.
*G06F 16/835* (2019.01)
*G06F 16/24* (2019.01)
*G06F 16/2458* (2019.01)
*G06F 16/2453* (2019.01)
*G06F 16/838* (2019.01)

(52) U.S. Cl.
CPC ...... *G06F 16/8358* (2019.01); *G06F 16/2471* (2019.01); *G06F 16/24534* (2019.01); *G06F 16/838* (2019.01)

(58) Field of Classification Search
None
See application file for complete search history.

(56) References Cited

U.S. PATENT DOCUMENTS

| | | | |
|---|---|---|---|
| 8,874,600 B2 * | 10/2014 | Gupta | G06F 16/245 707/763 |
| 2004/0068509 A1 * | 4/2004 | Garden | G06F 16/258 |
| 2008/0306984 A1 * | 12/2008 | Friedlander | G06F 16/23 |
| 2012/0030247 A1 * | 2/2012 | Yambal | G06F 16/119 707/802 |
| 2014/0006351 A1 * | 1/2014 | Laitkorpi | G06F 16/275 707/634 |
| 2015/0134633 A1 * | 5/2015 | Colgrove | G06F 16/903 707/706 |
| 2015/0339359 A1 * | 11/2015 | Takaoka | G06F 16/211 707/602 |

\* cited by examiner

*Primary Examiner* — Son T Hoang
(74) *Attorney, Agent, or Firm* — Klarquist Sparkman, LLP

(57) ABSTRACT

A system can receive an identifier for a query used by a query service of one or more query services and an identifier for the query used by an issuing computer system. The query service and the computer system that issued the query can use different schemas for query results. A mapping can be established that maps elements of one schema to the other schema. This mapping, and a mapping of the query identifiers, can be used to convert query results to a format useable by the computing system that issued the query. By converting query results from multiple query services, which may have different formats, to a common format of the issuing computing system, the use of multiple query services is facilitated.

20 Claims, 24 Drawing Sheets

```xml
<?xml version="1.0"?>
<Resume id="345486600" accountid="147136130">
    <ResumeProlog>
        <RevisionDate>
            <Date>
                <Month>3</Month>
                <Day>28</Day>
                <Year>2019</Year>
            </Date>
        </RevisionDate>
        <CompensationDetail>
            <Salary>
                <Current class="06" typeclass="">6-8万</Current>
                <CurrentType class="4">年薪</CurrentType>
                <CurrentInput class="">
                    <![CDATA[7]]>
                </CurrentInput>
                <Currtype class="">
                </Currtype>
                <Required class="06">6000-7999</Required>
                <RequiredType class="1">月薪</RequiredType>
                <RequiredInput class="06">
                    <![CDATA[6000-7999]]>
                </RequiredInput>
            </Salary>
        </CompensationDetail>
    </ResumeProlog>
    <ResumeBody>
        <PersonalData>
            <Name>
                <First>
                    <![CDATA[杨斌]]>
                </First>
                <Last />
            </Name>
            <Address>
                <AddressLine>
                    <![CDATA[]]>
                </AddressLine>
                <Province class="160300">廊坊</Province>
                <PostalCode>
            </PostalCode>
                <Country class="">
            </Country>
                <ContactType class="">
            </ContactType>
                <OtherContacts>
                    <![CDATA[]]>
                </OtherContacts>
            </Address>
            <Voice class="HomePhone">
                <IntlCode>
            </IntlCode>
                <AreaCode>
            </AreaCode>
                <TelNumber>
            </TelNumber>
                <Extension>
            </Extension>
            </Voice>
            <Voice class="FirmPhone">
                <IntlCode>
            </IntlCode>
                <AreaCode>
            </AreaCode>
                <TelNumber>
            </TelNumber>
                <Extension>
```

FIG. 4A

```xml
            </Extension>
            </Voice>
            <Voice class="MobilePhone">
                <IntlCode>086</IntlCode>
                <AreaCode />
                <TelNumber>13703164120</TelNumber>
                <Extension>
            </Extension>
            </Voice>
            <Email>
                <![CDATA[]]>
            </Email>
            <ProfileStatus>1</ProfileStatus>
        </PersonalData>
        <eHireSection>
            <Gender class="0">男</Gender>
            <HomePage>
                <![CDATA[]]>
            </HomePage>
            <BirthDay>
                <Date>
                    <Month>12</Month>
                    <Day>30</Day>
                    <Year>1990</Year>
                </Date>
            </BirthDay>
            <HuKou class="">
        </HuKou>
            <WorkYear class="2012">2012</WorkYear>
            <TopMajor class="0505">机械电子工程/机电一体化</TopMajor>
            <TopDegree class="5">大专</TopDegree>
            <GroupFlag>
                <HighGroup class="0">
            </HighGroup>
                <ITGroup class="0">
            </ITGroup>
                <StudentGroup class="0">
            </StudentGroup>
            </GroupFlag>
            <Objective>
                <EntryTime class="">
            </EntryTime>
                <SeekType class="0">全职</SeekType>
                <ExpectAreas>
                    <ExpectArea class="160300">廊坊</ExpectArea>
                    <ExpectArea class="010000">北京</ExpectArea>
                </ExpectAreas>
                <ExpectIndustrys>
                    <ExpectIndustry class="33">汽车及零配件</ExpectIndustry>
                    <ExpectIndustry class="14">机械/设备/重工</ExpectIndustry>
                    <ExpectIndustry class="35">仪器仪表/工业自动化</ExpectIndustry>
                </ExpectIndustrys>
                <ExpectFuncs>
                    <ExpectFunc class="0547">产品工艺/制程工程师
</ExpectFunc>
                </ExpectFuncs>
                <ExpectPositions>
                    <Position>
                        <![CDATA[产品工艺/制程工程师]]>
                    </Position>
                </ExpectPositions>
                <CompanyTypes />
            </Objective>
            <VideoUrl>
```

FIG. 4B

```xml
</VideoUrl>
    <ALITALKID>
        <![CDATA[]]>
    </ALITALKID>
    <QQID>
        <![CDATA[]]>
    </QQID>
    <Current_Situation class="0">目前正在找工作</Current_Situation>
    <Stature>
    </Stature>
    <Marriage class="">
    </Marriage>
    <TopIndustry class="">
    </TopIndustry>
    <TopFuncType class="2917">电子技术研发工程师</TopFuncType>
    <IsMBA class="">
    </IsMBA>
    <AddType class="0">
    </AddType>
    <usertags>
        <StartDate>
            <Date>
                <Month>
                </Month>
                <Day>
                </Day>
                <Year>
                </Year>
            </Date>
        </StartDate>
        <EndDate>
            <Date>
                <Month>
                </Month>
                <Day>
                </Day>
                <Year>
                </Year>
            </Date>
        </EndDate>
    </usertags>
    <resumekey />
    <mp_verifystatus>3</mp_verifystatus>
    <idcard_verifystatus>0</idcard_verifystatus>
    <topdegree_verifystatus>0</topdegree_verifystatus>
    <OpenStatus>0</OpenStatus>
    <Politics_Status class="">
    </Politics_Status>
</eHireSection>
<StructuredResume>
    <EmploymentHistory>
        <Position class="275157730">
            <EmployerName>
                <![CDATA[河北顺森科技发展有限公司]]>
            </EmployerName>
            <Department>
                <![CDATA[]]>
            </Department>
            <PositionTitle class="2917" extra="1">
                <![CDATA[电子技术研发工程师]]>
            </PositionTitle>
            <Industry class="">
```

FIG. 4C

```xml
            </Industry>
            <CompanyType class="">
            </CompanyType>
            <CompanySize class="">
            </CompanySize>
            <IsOverseas class="">
            </IsOverseas>
            <WorkType class="0">全职</WorkType>
            <EffectiveDate>
                <StartDate>
                    <Date>
                        <Month>4</Month>
                        <Day>1</Day>
                        <Year>2018</Year>
                    </Date>
                </StartDate>
                <EndDate>
                    <Date>
                        <Month>
                        </Month>
                        <Day>
                        </Day>
                        <Year>
                        </Year>
                    </Date>
                </EndDate>
            </EffectiveDate>
            <ExcecutiveNeed>
                <ReportBoss>
                    <![CDATA[]]>
                </ReportBoss>
                <ReportPersonNumber>
                    <![CDATA[]]>
                </ReportPersonNumber>
                <LeaveReason>
                    <![CDATA[]]>
                </LeaveReason>
                <Reference>
                    <![CDATA[]]>
                </Reference>
                <Score>
                    <![CDATA[]]>
                </Score>
            </ExcecutiveNeed>
            <SummaryText>
                <![CDATA[1.设计安全带提醒器和座椅加热,使用软件catia和CAD。
2.sop制定,生产问题处理。]]>
            </SummaryText>
        </Position>
        <Position class="275077155">
            <EmployerName>
                <![CDATA[廊坊富士康]]>
            </EmployerName>
            <Department>
                <![CDATA[]]>
            </Department>
            <PositionTitle class="0547" extra="1">
                <![CDATA[产品工艺/制程工程师]]>
```

FIG. 4D

```xml
</PositionTitle>
    <Industry class="">
</Industry>
    <CompanyType class="">
</CompanyType>
    <CompanySize class="">
</CompanySize>
    <IsOverseas class="">
</IsOverseas>
    <WorkType class="0">全职</WorkType>
    <EffectiveDate>
      <StartDate>
        <Date>
          <Month>5</Month>
          <Day>1</Day>
          <Year>2013</Year>
        </Date>
      </StartDate>
      <EndDate>
        <Date>
          <Month>4</Month>
          <Day>1</Day>
          <Year>2018</Year>
        </Date>
      </EndDate>
    </EffectiveDate>
    <ExcecutiveNeed>
      <ReportBoss>
        <![CDATA[]]>
      </ReportBoss>
      <ReportPersonNumber>
        <![CDATA[]]>
      </ReportPersonNumber>
      <LeaveReason>
        <![CDATA[]]>
      </LeaveReason>
      <Reference>
        <![CDATA[]]>
      </Reference>
      <Score>
        <![CDATA[]]>
      </Score>
    </ExcecutiveNeed>
    <SummaryText>
        <![CDATA[在富士康塑艺组装工作5年，主要工作:专案的引进及专案在生产中的制程问题分析解决。
1.负责经理下达的项目运作、跟踪与落实。
2、负责对相关产品的调查研究;提出建议，代表部门与相关方协商确定设计方案或计划目标。 
3、应用专业知识解决相关问题，控制并确保必要的研发步骤。 
4、制定及准备相关工作所必须的技术文件资料。
5、对生产提供支持，在制造、检验，调试模具设备时提供支持。 
6、负责样件制作。
7、负责制定进度计划并进行跟踪各阶段工作推进和问题的处理，以达到公司规划技术要求。
8、执行产品质量计划书，按照质量管理体系要求，抓好过程控制，实现产品的质量要求。  9、负责项目的技术管理，认真审核图纸，提交审图意见，掌握技术质量标准，熟悉产品规范，研究方案以及作业指导书，进行施工技术交底。 
10、根据产品施工计划，及时编制开工报告，加强与领导以及各相关部门的沟通，缩短工作流程时间，提高生产效率，服务项目施工
11、参与专案例会，讨论产品问题以及具体进度和解决方案，负责整合部门意见和进度上报公司领导。]]>
    >
```

FIG. 4E

```xml
</SummaryText>
    </Position>
  </EmploymentHistory>
  <EducationQualifs>
    <SchoolOrInstitution class="162795853">
      <SchoolName isfulltime="1" is211="" is985="">
        <![CDATA[河北劳动关系职业学院]]>
      </SchoolName>
      <extra_verifystatus>0</extra_verifystatus>
      <top_verifystatus>0</top_verifystatus>
      <istopdegree>0</istopdegree>
      <isextradegree>0</isextradegree>
      <IsOverseas class="">
      </IsOverseas>
      <IsMBA class="">
      </IsMBA>
      <EduDegree class="5">大专</EduDegree>
      <EduMajor class="0505" extra="1">
        <![CDATA[机械电子工程/机电一体化]]>
      </EduMajor>
      <EffectiveDate>
        <StartDate>
          <Date>
            <Month>9</Month>
            <Day>1</Day>
            <Year>2009</Year>
          </Date>
        </StartDate>
        <EndDate>
          <Date>
            <Month>6</Month>
            <Day>1</Day>
            <Year>2012</Year>
          </Date>
        </EndDate>
      </EffectiveDate>
      <SummaryText>
        <![CDATA[]]>
      </SummaryText>
    </SchoolOrInstitution>
  </EducationQualifs>
  <QualifSummary>
    <![CDATA[]]>
  </QualifSummary>
  <ExecResume>
    <BaseSalary>
    </BaseSalary>
    <Bonus>
    </Bonus>
    <Allowance>
    </Allowance>
    <Stock>
      <![CDATA[]]>
    </Stock>
  </ExecResume>
  <SummaryText />
</StructuredResume>
</ResumeBody>
</Resume>
```

FIG. 4F

```xml
<soap:Envelope xmlns:soap="http://schemas.xmlsoap.org/soap/envelope/">
  <soap:Header>
    <wsse:Security xmlns:wsse="http://docs.oasis-open.org/wss/2004/01/oasis-200401-wss-wssecurity-secext-1.0.xsd" xmlns:wsu="http://docs.oasis-open.org/wss/2004/01/oasis-200401-wss-wssecurity-utility-1.0.xsd" soap:mustUnderstand="1">
      <wsu:Timestamp wsu:Id="TS-71">
        <wsu:Created>2019-04-26T05:45:00.762Z</wsu:Created>
        <wsu:Expires>2019-04-26T05:50:00.762Z</wsu:Expires>
      </wsu:Timestamp>
    </wsse:Security>
  </soap:Header>
  <soap:Body>
    <ns1:getOfferCurriculumsV2Response xmlns:ns1="http://offercurriculum.endpoints.www.soap.infojobs.net/">
      <wsOfferCurriculumResponseBean>
        <currentPage>1</currentPage>
        <curriculum>
          <application>
            <coverLetter></coverLetter>
            <date>2019-01-28T00:00:00+01:00</date>
            <id>f063b607-64e3-435c-9c3e-1be60081230f</id>
          </application>
          <candidateId>89de2767-cf8a-4670-b8e0-18a3a9764284</candidateId>
          <curriculumId>982ab2d6-c7ae-4ea6-ad14-bda126d05d16</curriculumId>
          <cvtext>DISPONGO DEL CHEQUE TRANSICIÓN CON UNA AYUDA ECONÓMICA DE 5.140 EUROS. LOS CONTRATOS SUBVENCIONADOS CON ESTE CHEQUE DEL QUE SOY TITULAR SON DE UNA DURACIÓN MÍNIMA DE 12 MESES A JORNADA COMPLETA. TENGO EL DOCUMENTO QUE CERTIFICA QUE SOY EL TITULAR DE ESTE CHEQUE.</cvtext>
          <educations>
            <courseName>B1 DE INGLÉS</courseName>
            <currentlyEnrolled>false</currentlyEnrolled>
            <educationLevel>160</educationLevel>
            <finishingDate>2018-10-01T00:00:00+02:00</finishingDate>
            <id>34355927764</id>
            <institutionName>CLUB LAUDEM</institutionName>
          </educations>
          <educations>
            <courseName>NIVEL A2 DE INGLES</courseName>
            <currentlyEnrolled>false</currentlyEnrolled>
            <educationLevel>160</educationLevel>
            <finishingDate>2016-09-01T00:00:00+02:00</finishingDate>
            <id>240553227684</id>
            <institutionName>CLUB LAUDEM</institutionName>
          </educations>
          <educations>
            <courseName>CURSO DE MANIPULADOR DE ALIMENTOS</courseName>
            <currentlyEnrolled>false</currentlyEnrolled>
            <educationLevel>160</educationLevel>
            <finishingDate>2014-02-01T00:00:00+01:00</finishingDate>
            <id>20139477880</id>
            <institutionName>CENTRO DE FORMACIÓN ORETANA</institutionName>
          </educations>
```

FIG. 5A

```
<educations>
    <courseName>NIVEL A1 DE INGLES</courseName>
    <currentlyEnrolled>false</currentlyEnrolled>
    <educationLevel>160</educationLevel>
    <finishingDate>2013-09-01T00:00:00+02:00</finishingDate>
    <id>22393164226</id>
    <institutionName>CLUB LAUDEM</institutionName>
  </educations>
  <educations>
    <courseName>oposición de administrativo</courseName>
    <currentlyEnrolled>false</currentlyEnrolled>
    <educationLevel>170</educationLevel>
    <finishingDate>2019-04-02T00:00:00+02:00</finishingDate>
    <id>30654798658</id>
    <institutionName></institutionName>
    <startingDate>2017-02-02T00:00:00+01:00</startingDate>
  </educations>
  <educations>
    <courseName>oposición de auxilio judicial</courseName>
    <currentlyEnrolled>false</currentlyEnrolled>
    <educationLevel>170</educationLevel>
    <finishingDate>2019-04-02T00:00:00+02:00</finishingDate>
    <id>30654826952</id>
    <institutionName></institutionName>
    <startingDate>2017-02-02T00:00:00+01:00</startingDate>
  </educations>
  <educations>
    <courseName>oposición de auxiliar administrativo</courseName>
    <currentlyEnrolled>false</currentlyEnrolled>
    <educationLevel>170</educationLevel>
    <finishingDate>2019-04-02T00:00:00+02:00</finishingDate>
    <id>30654776976</id>
    <institutionName></institutionName>
    <startingDate>2017-02-02T00:00:00+01:00</startingDate>
  </educations>
  <educations>
    <courseName>oposición a letrados de la administración de justicia</courseName>
    <currentlyEnrolled>false</currentlyEnrolled>
    <educationLevel>170</educationLevel>
    <finishingDate>2019-04-02T00:00:00+02:00</finishingDate>
    <id>30654879884</id>
    <institutionName></institutionName>
    <startingDate>2017-02-02T00:00:00+01:00</startingDate>
  </educations>
  <educations>
    <courseName>oposición de gestión procesal y administrativa</courseName>
    <currentlyEnrolled>false</currentlyEnrolled>
    <educationLevel>170</educationLevel>
    <finishingDate>2019-04-02T00:00:00+02:00</finishingDate>
    <id>30654847624</id>
    <institutionName></institutionName>
    <startingDate>2017-02-02T00:00:00+01:00</startingDate>
  </educations>
```

FIG. 5B

```
<educations>
    <courseName>oposición de tratamitación procesal y administrativa</courseName>
    <currentlyEnrolled>false</currentlyEnrolled>
    <educationLevel>170</educationLevel>
    <finishingDate>2019-04-02T00:00:00+02:00</finishingDate>
    <id>30654864298</id>
    <institutionName></institutionName>
    <startingDate>2017-02-02T00:00:00+01:00</startingDate>
  </educations>
  <educations>
    <courseName>oposición de celador</courseName>
    <currentlyEnrolled>false</currentlyEnrolled>
    <educationLevel>170</educationLevel>
    <finishingDate>2019-04-02T00:00:00+02:00</finishingDate>
    <id>29435377750</id>
    <institutionName></institutionName>
    <startingDate>2016-08-02T00:00:00+02:00</startingDate>
  </educations>
  <educations>
    <courseCode>2062</courseCode>
    <courseName></courseName>
    <currentlyEnrolled>false</currentlyEnrolled>
    <educationLevel>55</educationLevel>
    <finishingDate>2017-06-19T00:00:00+02:00</finishingDate>
    <id>23189839534</id>
    <institutionName>Instituto La Sisla (Sonseca)</institutionName>
    <startingDate>2014-09-19T00:00:00+02:00</startingDate>
  </educations>
  <educations>
    <courseCode>28</courseCode>
    <courseName></courseName>
    <currentlyEnrolled>false</currentlyEnrolled>
    <educationLevel>140</educationLevel>
    <finishingDate>2013-11-01T00:00:00+01:00</finishingDate>
    <id>19643474384</id>
    <institutionName>Universidad de Castilla La Mancha (San Pedro Martir, Toledo)</institutionName>
    <startingDate>2006-09-01T00:00:00+02:00</startingDate>
  </educations>
```

```
<email>victorsonsecano@hotmail.com</email>
  <experiences>
    <category>100</category>
    <company>ASESORIA ANTICO</company>
    <currentlyWorking>false</currentlyWorking>
    <description>Desempeño tareas jurídicas y administrativas. Tambien asesoramiento jurídico y financiero y manejo de bases de datos. Redactar contratos de la empresa.</description>
    <finishingDate>2019-04-02T13:42:51.110+02:00</finishingDate>
    <id>34188472565</id>
    <level>2</level>
    <staffInCharge>1</staffInCharge>
    <startingDate>2018-09-02T13:42:51.109+02:00</startingDate>
    <subcategories>3066</subcategories>
    <title>Asesor jurídico y asesor fiscal. Administrativo.</title>
  </experiences>
  <experiences>
    <category>20</category>
    <company>Ayuntamiento de Sonseca</company>
    <currentlyWorking>false</currentlyWorking>
    <description>Mantenimiento de jardines y limpiar colegios o otros edificios públicos. Hago también funciones de conserje, portero y jefe de sala.</description>
    <finishingDate>2018-08-02T14:36:40.628+02:00</finishingDate>
    <id>31971014574</id>
    <industry>26</industry>
    <level>2</level>
    <staffInCharge>1</staffInCharge>
    <startingDate>2017-09-02T14:36:40.628+02:00</startingDate>
    <subcategories>3011</subcategories>
    <title>Personal de mantenimiento, conserje, portero y jefe de sala</title>
  </experiences>
  <experiences>
    <category>100</category>
    <company>Despacho de abogados: Sagrario Martín Maestro y Alejandro Javier Diaz-Suelto Villarrubia</company>
    <currentlyWorking>false</currentlyWorking>
    <description>Ir a juicios, redactar documentos(redactar demandas civiles, penales y laborales, juras de cuentas y impugnación de costas y minutas, también redacto documentos administrativos y penales y también archivar documentos de la empresa, hacer nominas de la empresa y pasar facturas en el programa eoiva ), llevar asuntos administrativos de la empresa (contabilidad de la empresa en el programa conta plus, archivar documentos de la empresa.</description>
    <finishingDate>2017-07-02T13:43:20.832+02:00</finishingDate>
    <id>29837390404</id>
    <industry>44</industry>
    <level>1</level>
    <staffInCharge>1</staffInCharge>
    <startingDate>2016-09-02T13:43:20.832+02:00</startingDate>
    <subcategories>3063</subcategories>
    <subcategories>3065</subcategories>
    <subcategories>3066</subcategories>
    <title>Abogado</title>
  </experiences>
```

FIG. 5D

```xml
<experiences>
    <category>20</category>
    <company>Ayuntamiento de Sonseca</company>
    <currentlyWorking>false</currentlyWorking>
    <description>Mantenimiento de parque y jardines. Limpieza de colegios.</description>
    <finishingDate>2015-12-02T13:43:40.223+01:00</finishingDate>
    <id>24122727942</id>
    <industry>26</industry>
    <level>2</level>
    <staffInCharge>1</staffInCharge>
    <startingDate>2015-04-02T13:43:40.223+02:00</startingDate>
    <subcategories>3013</subcategories>
    <title>Personal de mantenimiento</title>
</experiences>
<futureJob>
    <availabilityToChangeHomeAddress>2</availabilityToChangeHomeAddress>
    <availabilityToTravel>2</availabilityToTravel>
    <careerGoals></careerGoals>
    <contractTypes>1</contractTypes>
    <currentlyWorking>false</currentlyWorking>
    <employmentStatus>1</employmentStatus>
    <lastJobSearch>12</lastJobSearch>
    <motivationToChange></motivationToChange>
    <preferredDestinations>1</preferredDestinations>
    <preferredJob>Abogado y administrativo.</preferredJob>
    <preferredSalary>140</preferredSalary>
    <preferredSubcategories>3040</preferredSubcategories>
    <preferredSubcategories>3063</preferredSubcategories>
    <salaryMin>140</salaryMin>
    <salaryPeriod>2</salaryPeriod>
    <workDay>1</workDay>
    <yearsOfExperience>3</yearsOfExperience>
</futureJob>
<lastUpdate>2019-04-21T20:42:16+02:00</lastUpdate>
<personalData>
    <address>Calle Nuñez de Balboa número 21</address>
    <birthDate>1987-02-23T00:00:00+01:00</birthDate>
    <city>Sonseca</city>
    <country>17</country>
    <driverLicenses>4</driverLicenses>
    <freelance>false</freelance>
    <gender>10</gender>
    <internationalPhone></internationalPhone>
    <landLinePhone></landLinePhone>
    <mobilePhone>616327228</mobilePhone>
    <name>Victor Mánuel</name>
```

FIG. 5E

```xml
    <nationalIdentityCard>03916675M</nationalIdentityCard>
    <nationalIdentityCardType>1</nationalIdentityCardType>
    <nationalities>17</nationalities>
    <photo>https://www.infojobs.net/candidato.foto?id_candidato=982ab2d6-c7ae-4ea6-ad14-bda126d05d16&CameFrom=perfil</photo>
    <province>48</province>
    <surname1>Marín</surname1>
    <surname2>Martín</surname2>
    <vehicleOwner>true</vehicleOwner>
    <zipCode>45100</zipCode>
</personalData>
<skills>
    <expertise>
        <level>alto</level>
        <name>comunicacion y atencion al cliente</name>
    </expertise>
    <expertise>
        <level>alto</level>
        <name>Conocimientos de informática.</name>
    </expertise>
    <expertise>
        <level>alto</level>
        <name>Contabilidad</name>
    </expertise>
    <expertise>
        <level>alto</level>
        <name>Documentación jurídica</name>
    </expertise>
    <expertise>
        <level>alto</level>
        <name>Fiscalidad</name>
    </expertise>
    <expertise>
        <level>alto</level>
        <name>Formación y orientación laboral</name>
    </expertise>
    <expertise>
        <level>alto</level>
        <name>Gestión en recursos humanos</name>
    </expertise>
    <expertise>
        <level>alto</level>
        <name>Gestión financiera</name>
    </expertise>
    <expertise>
        <level>alto</level>
        <name>Gestión logística y comercial.</name>
    </expertise>
```

FIG. 5F

```xml
<level>bajo</level>
      <name>Ingles A2</name>
    </expertise>
    <language>
      <name>1</name>
      <reading>172786762</reading>
      <speaking>172786749</speaking>
      <writing>172786756</writing>
    </language>
    <language>
      <comments></comments>
      <name>3</name>
      <reading>172786760</reading>
      <speaking>172786746</speaking>
      <writing>172786753</writing>
    </language>
  </skills>
</curriculum>
<curriculum>
  <application>
    <coverLetter></coverLetter>
    <date>2019-01-28T00:00:00+01:00</date>
    <id>e0aab060-b72f-48fc-a30c-8309044bd9b6</id>
  </application>
  <candidateId>4b6aa85b-a124-4c9b-9d77-7799022646 5e</candidateId>
  <curriculumId>289af6b1-e8fc-4962-914d-71984c84d31f</curriculumId>
  <cvtext></cvtext>
  <educations>
    <courseName></courseName>
    <currentlyEnrolled>false</currentlyEnrolled>
    <educationLevel>20</educationLevel>
    <finishingDate>2005-12-01T00:00:00+01:00</finishingDate>
    <id>34617234040</id>
    <institutionName>CENTRO ESO</institutionName>
    <startingDate>2000-01-01T00:00:00+01:00</startingDate>
  </educations>
  <email>mario.santiago@infojobs.net</email>
  <experiences>
    <category>190</category>
    <company>InfoJobs</company>
    <currentlyWorking>true</currentlyWorking>
    <description>KAM InfoJobs</description>
    <id>34190185577</id>
    <level>5</level>
```

FIG. 5G

```xml
    <managerLevel>1</managerLevel>
    <salaryMax>390</salaryMax>
    <salaryMin>240</salaryMin>
    <salaryPeriod>3</salaryPeriod>
    <staffInCharge>1</staffInCharge>
    <startingDate>2015-03-01T01:00:00+01:00</startingDate>
    <subcategories>3127</subcategories>
    <title>KAM</title>
  </experiences>
  <futureJob>
    <careerGoals></careerGoals>
    <currentlyWorking>false</currentlyWorking>
    <motivationToChange></motivationToChange>
    <preferredJob></preferredJob>
    <yearsOfExperience>5</yearsOfExperience>
  </futureJob>
  <lastUpdate>2018-11-16T13:35:50+01:00</lastUpdate>
  <personalData>
    <address></address>
    <birthDate>1980-01-01T00:00:00+01:00</birthDate>
    <city>Madrid Capital</city>
    <country>17</country>
    <freelance>false</freelance>
    <gender>10</gender>
    <internationalPhone></internationalPhone>
    <landLinePhone></landLinePhone>
    <mobilePhone>616968110</mobilePhone>
    <name>MARIO</name>
    <nationalIdentityCard></nationalIdentityCard>
    <nationalIdentityCardType>1</nationalIdentityCardType>
    <province>33</province>
    <surname1>S</surname1>
    <surname2></surname2>
    <vehicleOwner>false</vehicleOwner>
    <zipCode>28020</zipCode>
  </personalData>
  <skills>
    <expertise>
      <level>alto</level>
      <name>Microsoft Office</name>
    </expertise>
    <language>
      <comments></comments>
      <name>3</name>
      <reading>172786761</reading>
      <speaking>172786748</speaking>
      <writing>172786754</writing>
    </language>
  </skills>
</curriculum>
```

FIG. 5H

```
{
    "id": 201803001,
    "dados_pessoais": {                              ← 614
        "nome": "tracy201803001 test",
        "data_de_nascimento": "1980-10-08",
608 →  "estado_civil": "Solteiro(a)",
        "filhos": 0,
        "pais_de_nacionalidade": "Brasileiro",
        "genero": "feminino",
        "informacoes_de_contato": {
            "email": "tracy201803001@hotmail.com",
            "telefone": {
                "residencial": {
                    "numero": "85 9690-5350\r\nwhatsapp 9 8559-8522"
                },
                "celular": {
                    "codigo_do_pais": "55",
608 →           "ddd": "85",
                    "numero": "996905350"            ← 614
                }
            }
        },
        "documentos": [
            {
                "tipo": "CPF (BRA)",
                "numero": "77563581120"
            }
        ],
        "endereco": {
            "pais": "Brasil",
            "uf": "Ceará",
            "cidade": "Fortaleza",
            "bairro": "Cidade dos Funcionários",
            "logradouro": "Rua José do Nascimento, 690 Ap 105",
            "cep": "60822600"
        },
        "pdf-url": "/v1/pubvagas/vagas/1582555/candidatos/1356500.pdf",
        "adendos": {}
    }
}
```

```
public class RawCandidate {
    private final String id;            ── 708
    private final Object profile;       ── 710
    private final byte[] attachment;    ── 712
                                        ── 714
    private String attachmentExtension;

── 718
    private String jobId;               716
    private String candidateName;   ── public RawCandidate(String id, Object profile, byte[] attachment) {
      this.id = id;
      this.profile = profile;
      this.attachment = attachment;
    } public String getId() {
      return id;
    } public String getJobId() {
      return jobId;
    } public void setJobId(String jobId) {
      this.jobId = jobId;
    } public String getCandidateName() {
      return candidateName;
    } public void setCandidateName(String candidateName) {
      this.candidateName = candidateName;
    } public Object getProfile() {
      return profile;
    } public byte[] getAttachment() {
      return attachment;
    }

/**
     * @return the attachmentExtension
     */
    public String getAttachmentExtension() {
      return attachmentExtension;
    }

/**
     * @param attachmentExtension the attachmentExtension to set
     */
    public void setAttachmentExtension(String attachmentExtension) {
      this.attachmentExtension = attachmentExtension;
    }

```
import java.util.ArrayList;                                              800
import java.util.List;

public class ParsedCandidate {            810
  private final ProfileHeader profileHeader;
                                                  812
  private final ResumeAttachment resumeAttachment;
                                                        814
  private List<Property> properties = new ArrayList<Property>();
                                                                   820
  public ParsedCandidate(ProfileHeader profileHeader, ResumeAttachment resumeAttachment) {
    this.profileHeader = profileHeader;
    this.resumeAttachment = resumeAttachment;
  }
                                            824
  public List<Property> getProperties(String entityType) {
    List<Property> result = new ArrayList<Property>();
    for (Property property : properties) {
      if (property.getEntityType().equals(entityType)) {
        result.add(property);
      }
    }
    return result;
  }
                            828
  public void addProperty(Property property) {
    if (property != null) {
      properties.add(property);
    }
  }
                            832
  public void addProperties(List<? extends Property> properties) {
    if (properties != null) {
      for (Property property : properties) {
        addProperty(property);
      }
    }
  }
                            836
  public ProfileHeader getProfileHeader() {
    return profileHeader;
  }
                          840
  public ResumeAttachment getResumeAttachment() {
    return resumeAttachment;
  }

```
import java.util.HashMap;
import java.util.Map;

public enum FileExtension {

DOC(".doc"),
    PDF(".pdf"),
    HTML(".html"),
    DOCX(".docx"),
    TXT(".txt"),
    XML(".xml"),
    JPEG(".jpeg"),
    JPG(".JPG"),
    PNG(".png");

private final String extension;

private FileExtension(String extension) {
        this.extension = extension;
    } public String extension() {
        return extension;
    } private static final Map<String, FileExtension> mappings = new HashMap<String, FileExtension>(6);

static {
        for (FileExtension fileExtension : FileExtension.values()) {
            mappings.put(fileExtension.extension(), fileExtension);
        }
    } public static FileExtension resolve(String extension) {
        return (extension == null) ? null : mappings.get(extension);
    }

```java
import java.util.ArrayList;
import java.util.List;

public class NavigationProperty implements Property {
  private final String sfPropId;           // 1310
  private final String entityType;         // 1312
  private final String navEntityType;      // 1314
  private boolean required;                // 1316
  private boolean isMultiple;              // 1318
  private List<Property> properties = new ArrayList<Property>();  // 1320

// 1330
  public NavigationProperty(String sfPropId, String entityType, String navEntityType, boolean isMultiple) {
    this.sfPropId = sfPropId;
    this.entityType = entityType;
    this.navEntityType = navEntityType;
    this.isMultiple = isMultiple;
  }

@Override        // 1332
  public String getSfPropId() {
    return sfPropId;
  }

@Override        // 1334
  public String getEntityType() {
    return entityType;
  }

@Override        // 1336
  public boolean isRequired() {
    return required;
  }

// 1342
  public void setRequired(boolean required) {
    this.required = required;
  }

// 1344
  public List<Property> getProperties() {
    return properties;
  }

// 1346
  public void addProperty(Property property) {
    if (property != null) {
      properties.add(property);
    }
  }

// 1348
  public String getNavEntityType() {
    return navEntityType;
  }

@Override        // 1338
  public boolean isNavigation() {
    return true;
  }

// 1350
  public boolean isMultiple() {
    return isMultiple;
  }
}
```

```
public class SimpleProperty implements Property {
  private final String sfPropId;        ──1406
  private final Object value;           ──1408
  private final String entityType;      ──1410
  private final boolean required;       ──1412
                                        ──1416
  private SimpleProperty(SimplePropertyBuilder builder) {
    this.sfPropId = builder.sfPropId;
    this.value = builder.value;
    this.entityType = builder.entityType;
    this.required = builder.required;
  } public static class SimplePropertyBuilder {
    private String sfPropId = null;     ──1452
    private Object value = null;        ──1454
    private String entityType = null;   ──1456
    private boolean required = false;   ──1458
                                        ──1464
    public SimplePropertyBuilder reset() {
      this.sfPropId = null;
      this.value = null;
      this.entityType = null;
      this.required = false;
      return this;
    } public SimplePropertyBuilder setSfPropId(String sfPropId) {
      this.sfPropId = sfPropId;
      return this;
    } public SimplePropertyBuilder setValue(Object value) {
      this.value = value;
      return this;
    } public SimplePropertyBuilder setEntityType(String entityType) {
      this.entityType = entityType;
      return this;
    } public SimplePropertyBuilder setRequired(boolean required) {
      this.required = required;
      return this;
    } public SimpleProperty build() {
      return new SimpleProperty(this);
    }
  }

@Override
  public String getSfPropId() {
    return sfPropId;
  }

@Override
  public boolean isRequired() {
    return required;
  }

@Override
  public String getEntityType() {
    return entityType;
  }

@Override
  public boolean isNavigation() {
    return false;
  } public Object getValue() {
    return value;
  }
}
```

FIG. 14

RETRIEVAL AND CONVERSION OF QUERY RESULTS FROM MULTIPLE QUERY SERVICES

FIELD

The present disclosure generally relates to retrieving query results for a query that may have been submitted to multiple query services. Particular implementations relate to retrieving query results from query services, converting them to a format useable by a computing device that submitted the query, and then sending the converted results to such computing device.

BACKGROUND

Interoperability and compatibility are ongoing issues in software design. In some ways, the advent of the internet has made these problems easier, but in other ways it has made them more complex. Although data transfer over the internet is governed by particular protocols, such as HTTP and TCP/IP, the format of the data as sent by one computing entity can be different than a format used by other computing entities.

To some extent, data formats can be made more consistent, or at least easier to use, with serialized formats such as JSON and XML. However, metadata, such as in a schema definition, may still differ between a serialized format sent by one computing entity and a format used by another computing entity. Moreover, different computing entities may provide serialized formats for information having the same basic purpose, but the encoding formats may differ (e.g., using XML rather than JSON), as well as the metadata used—in terms of the labels used for the metadata, an order or grouping (including a hierarchical grouping) of metadata elements, and datatypes associated with values for the metadata (e.g., one format may represent a value as a string, and another format may represent the value, for an equivalent metadata element, as an integer).

In addition, some of the values used by different systems for the same data object may differ. That is, a first computing entity may have assigned a first identifier to a first data object, but a second computing entity may use a second identifier for that data, represented as a second data object. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for receiving query results from one or more query services. A system implementing disclosed techniques can receive an identifier for the query used by a query service and an identifier for the query used by the issuing computer system. The query service and the computer system that issued the query can use different schemas for query results. A mapping can be established that maps elements of one schema to the other schema. This mapping, and a mapping of the query identifiers, can be used to convert query results to a format useable by the computing system that issued the query. By converting query results from multiple query services, which may have different formats, to a common format of the issuing computing system, the use of multiple query services is facilitated.

In one aspect, a method is provided for retrieving a query result from a query service, converting the result to a format useable by a computing device, and sending the query result to the computing device. A first identifier is received. The first identifier is used by a first computing device to identify a first query posted to a first query service. A second identifier is received. The second identifier is used by the first query service to identify the first query.

At least a first query response to the first query is received from the first query service. The first query response is in a first schema, comprising a first plurality of metadata fields and having first values for at least a portion of the first plurality of metadata fields. It is determined that the at least a first query response is responsive to the first query. At least a portion of the first values are extracted from the at least a first query response.

A first instance of a query response schema is instantiated with at least a portion of the extracted first values. The query response schema has a second plurality of metadata fields, where at least a portion of the second plurality of metadata fields differ from at least a portion of the first plurality of metadata fields. The first instance of the query response schema is associated with the first identifier. The first instance of the query response schema is sent to the first computing device.

In another aspect, a method is provided for retrieving query results from first and second query services, converting the results to a format useable by a computing device, and sending the query results to the computing device. A first identifier is received. The first identifier is used by a first computing device to identify a first query posted to a first query service and at least a second query service. A second identifier is received. The second identifier is used by the first query service to identify the first query. A third identifier is received. The third identifier is used by the second query service to identify the first query.

At least a first query response to the first query is received from the first query service. The at least a first query response has a first schema comprising a first plurality of metadata fields and first values for at least a portion of the first plurality of metadata fields. At least a second query response to the first query is received from the second query service. The at least a second query response has a second schema comprising a second plurality of metadata fields and second values for at least a portion of the second plurality of metadata fields. It is determined that the at least a first query response is responsive to the first query. At least a portion of the first values are extracted from the at least a first query response.

A first instance of a query response schema is instantiated with at least a portion of the extracted first values. The query response schema has a third plurality of metadata fields. At least a portion of the third plurality of metadata fields differ from at least a portion of the first plurality of metadata fields. The first instance of the query response schema is associated with the first identifier. The first instance of the query response schema is sent to the first computing device.

It is determined that the at least a second query response is responsive to the first query. At least a portion of the second values are extracted from the at least a second query response. A second instance of the query response schema is instantiated with at least a portion of the extracted second values. The second instance of the query response schema is associated with the first identifier. The second instance of query response schema is sent to the first computing device.

In a further aspect, a method is provided for retrieving a query result from a query service, converting the result to a format useable by a first computing device using a mapping configuration, and sending the query result to the first computing device. A first identifier is received. The first identifier is used by the first computing device to identify a first query posted to a first query service. A second identifier is received. The second identifier is used by the first query service to identify the first query.

A first mapping configuration is received. The first mapping configuration maps at least a portion of elements of a first metadata schema used by the first query service to metadata elements of a second metadata schema used by the first computing device. The first mapping configuration is stored. At least a first query response, in the first metadata schema, for the first query is received from the first query service. It is determined that the at least a first query response is responsive to the first query. At least a portion of first values of metadata elements of the at least a first query response is extracted.

It is determined that the first query response is associated with the first mapping configuration. The first mapping configuration is retrieved. A first instance of the second metadata schema is instantiated by mapping at least a portion of the first values to metadata elements of the second metadata schema using the first mapping configuration. The first instance of the second metadata schema is associated with the first identifier. The first instance of the second metadata schema is sent to the first computing device.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 4A-4F provide XML code for example query results in a first query results schema.

FIGS. 5A-5H provide XML code for example query results in a second query results schema.

FIG. 6 provides example JSON code for query results in a third query results schema.

FIGS. 7-14 provide example JAVA code for classes that can be used to hold query results in a first format and to hold query results in a second format, where query results can be converted between the first format and the second format.

DETAILED DESCRIPTION

Example 1—Overview

Figure 1:
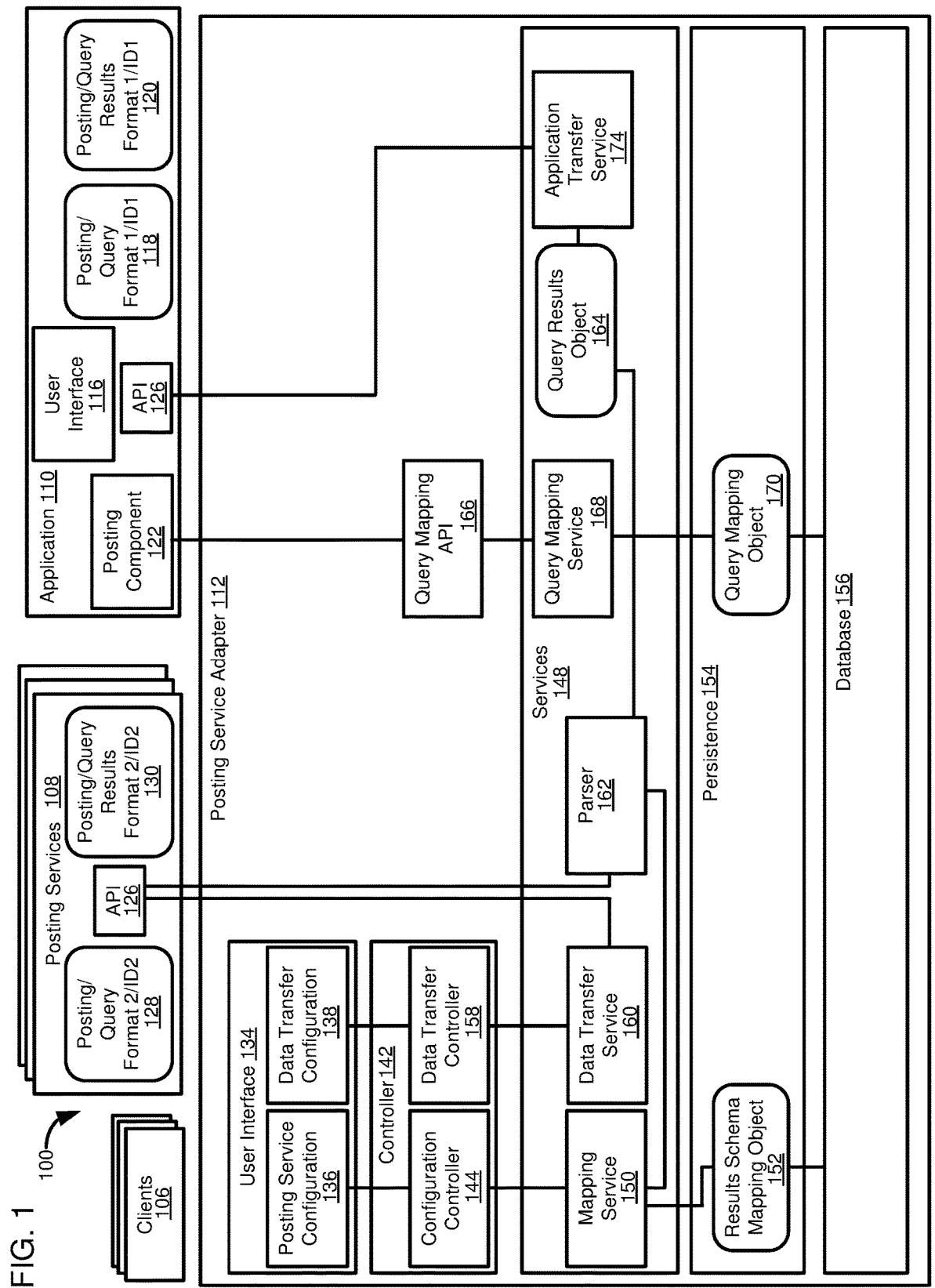
FIG. 1 is a diagram of a computing environment in which disclosed technologies can be implemented.

Interoperability and compatibility are ongoing issues in software design. In some ways, the advent of the internet has made these problems easier, but in other ways it has made them more complex. Although data transfer over the internet is governed by particular protocols, such as HTTP and TCP/IP, the format of the data as sent by one computing entity can be different than a format used by other computing entities.

To some extent, data formats can be made more consistent, or at least easier to use, with serialized formats such as JSON and XML. However, metadata, such as in a schema definition, may still differ between a serialized format sent by one computing entity and a format used by another computing entity. Moreover, different computing entities may provide serialized formats for information having the same basic purpose, but the encoding formats may differ (e.g., using XML rather than JSON), as well as the metadata used—in terms of the labels used for the metadata, an order or grouping (including a hierarchical grouping) of metadata elements, and datatypes associated with values for the metadata (e.g., one format may represent a value as a string, and another format may represent the value, for an equivalent metadata element, as an integer).

In addition, some of the values used by different systems for the same data object may differ. That is, a first computing entity may have assigned a first identifier to a first data object, but a second computing entity may use a second identifier for that data, represented as a second data object. Accordingly, room for improvement exists.

In a specific example, a software application may post a query to different computing systems where query responses can be provided. The query may be assigned an identifier by the software application, but assigned different identifiers by the computing systems to which the query was posted. The software application can have a schema, such as reflected in structured data representation, such as XML or JSON, or in a datatype (such as an abstract datatype, such as an instance of a particular class for an object type associated with the query response). The computing systems to which the query responses were posted may provide query responses in different formats, different schemas, or both, than each other, or the format used by the computing system that posted the query.

In many cases, users manually convert data, as reflected in a query response, between formats. For example, the computing system that post a query and receives one or more query responses can send its query results to a computing system used by the user. The user can manually request and read the data in the query response, and then manually enter the data into a software application used to manipulate query results, which can be the same software application where the query originated. However, this process can be extremely time consuming, particularly when many queries may be submitted, with tens or hundreds of query responses often received for each query.

The present disclosure provides technologies for facilitating receiving query responses, including query responses from different computing services/query service providers, where the services may use different APIs, provide query responses in different formats, or a combination thereof. A posting (or query) service adapter can be configured to retrieve query responses from one or more posting services. Typically, a configuration in the posting service adapter is created for each different API that is to be called. The posting service adapter can be expandable, and flexible, in that new posting services can be incorporated into the system (e.g., used with posting/queries) by creating a new configuration that works with the API of the new posting service. Similarly, if a posting service changes its API, the corresponding configuration of the posting service can be updated to work with the updated API.

After query results (e.g., one or more posting replies to a posting) are received, the query results can be converted to a format used by an end application. Thus, even though a variety of posting services can be used, and configurations updated or changed in the posting service adapter, these changes can be abstracted from the end application that uses the posting replies (i.e., query results). In a particular example, query results can be converted to an intermediate format, mapped by the posting service adapter from a schema used by the posting service to a schema used by the end application, converted to a format usable by the end application, and sent to the end application. The use of the intermediate format can facilitate the mapping process, and can also allow query results to be returned to different end applications that use different schemas/data formats.

Example 2—Example Computing Environment Facilitating Posting Queries to, and Receiving Query Results from, Multiple Query Services FIG. 1 illustrates a computing environment 100 in which disclosed technologies can be implemented. Generally, the computing environment 100 includes one or more clients 106, one or more posting services 108, at least one application 110 that receives posting requests from a client for posting queries to a posting service, and a posting service adapter 112 that receives query results (or posting replies) from one or more of the posting services, processes the results, and sends the processed results to the application in a format used by the application, where the results can then be sent or presented to the relevant client 106.

The application 110 can include a user interface 116. The user interface 116 can be accessed by the clients 106, such as to create queries or to post queries to one or more of the posting services 108. For example, a user may use the user interface 116 to create a query and select one or more of the posting services 108 to receive the query. The user interface 116 can also allow a user to view query results that may be received from a posting service 108, such as through the posting service adapter 112. In at least some cases, the application 110 may allow a user to receive information, including query results, from a posting service 108 in another manner, such by manually accessing a posting service and retrieving query results.

The application 110 can use postings or queries in a first format 118. The first format can include one or both of a first schema and a first data format (e.g., an encoding format, such as JSON or XML, or an instance of an abstract datatype or object in an object-oriented programming language, where the application may convert between representations, such as an abstract datatype/object and a serialized representation in a format such as JSON or XML). The first format 118 is typically also associated with a first identifier, which can be used to distinguish between different postings (e.g., instances of the object or serialized object) from one another.

Similarly, the application 110 can use query results (or posting replies) in a first format 120. Like postings in the first format 118, the query results in the first format 120 can include one or both of a first schema and a first data format, which can be the same as, or different than, the schema/format used for the query. The query results 120 can be associated with first identifiers, which can be used to distinguish query results from one another. In at least some cases, a particular query result 120 can include a query result identifier and the identifier of the posting in the first format 118. Including the identifier of the query in the query results in the first format 120 can assist in tracking to which posting given posting replies should be associated.

The application 110 can include a posting component 122. The posting component 122 can be configured to send postings in the first format 118 to one or more of the posting services 108. Typically, the posting component 122 sends the postings in the first format 118 to a posting service 108 by calling an API 126 of the relevant posting service 108.

Typically, a posting service 108 will maintain postings in a second format 128 and query results in a second format 130 (which may be implemented generally as described for the postings/results 118, 120, except differing in one or both of schema/metadata or format, such as encoding format). The postings in the second format 128 and the query results in the second format 130 can be associated with respective identifiers, as described for the queries 118/query results 120. Typically, the identifiers used by the posting service 108 are different than the identifiers used by the application 110, although in at least some cases the posting service can include at least the identifier of the posting in the first format 118 in the posting in the second format 128 or the query results in the second format 130. The posting component 122 can, in at least some implementations, convert a posting in the first format 118 to the second format 128, or to a format accepted by the API 126 of the relevant posting service 108, where the API can be responsible for converting data received through the API to the second format.

A posting service 108 can receive, or generate, query results, and can store the query results in the second format 130. In a specific example, a posting service 108 can cause a posting to be displayed to a plurality of users (which can be considered a type of client 106), who can reply or respond to the query (such as through the API 126) to provide query results stored as the query results in the second format 130. In other cases, a user may store information on a posting service 108, and can indicate whether this information should be used to generate posting results for a given posting.

The posting service adapter 112 can be configured to automate, or at least help automate, a process of transferring query results in the second format 130 to the application 110. Even putting aside format differences, it can be time consuming and cumbersome for a user (e.g., a client 106) to request query results for multiple postings on multiple posting services 108. The posting service adapter 112 can map the identifier for a given posting in the first format 118 to a particular posting service 108 to which the posting was submitted (e.g., by the posting component 122).

The posting service adapter 112 can service requests (e.g., from the application 110, which can originate at a client 106), to request query results for a given query (or for multiple queries) from all, or selected members of, the posting services 108 to which the posting was submitted.

The posting service adapter 112 can further facilitate automation by converting query results between the second format 130, or the format provided by the API 126, and a format used by the application 110 (e.g., the first format 120, or a format in which the application is configured to receive query results, which are then converted to the first format).

The posting service adapter 112 can include a user interface 134. The user interface 134 can allow a user (e.g., a client 106, or an administrator of a computing system, such as a cloud computing system, on which the posting service adapter is hosted) to configure the posting service adapter 112 to access particular posting services 108, or to take various actions with respect to a posting service, such as to retrieve query results 130. To this end, the user interface 134 can include a posting service configuration component 136 and a data transfer configuration component 138.

The posting service configuration component 136 can be used to create a profile for a posting service 108. The profile can include information regarding the API 126 of a given posting service, including a location of the API (e.g., a URI), methods in the API (for example, for retrieving query results for a posting associated with a given identifier, such as used in the posting in the second format 128), and information useable in converting query results received from the query results in the second format 130 to the query results in the first format 120. Information useable in converting query results between formats can include information useable to map from a schema associated with the second format 130 to a schema associated with the first format 120, or converting data between datatypes.

As an example, an element of the query results in the second format 130 may represent a particular value (e.g., a value associated with a particular metadata element of a schema), such as a calendar date/time, as a string, while the corresponding metadata element of the query results in the first schema 120 may represent the value in a particular time unit datatype (e.g., day/month/year/hours/minutes/seconds/milliseconds). Converting from the query results in the second format 130 can also include converting from a particular file or encoding format sent by the API 126, such as converting data from an XML representation or a JSON representation to an intermediate format that is further processed by the posting service adapter 112, and is eventually converted to the query results in the first format 120.

The data transfer configuration component 138 can be used by a user (such as a client 106) to interact with the posting service adapter 112 to take various actions with respect to a posting service 108. For example, a user (e.g., a client 106, including in association with the application 110) can provide a posting identifier, such as the identifier associated with a posting in the first format 118 or an identifier associated with a posting in the second format 128, and receive corresponding query results. In some cases, the data transfer configuration component 138 can allow a user to select whether to receive query results from one or more particular, selected posting services 108, or to receive query results from all relevant posting services. In addition to providing the ability for a user to manually request query results, the data transfer configuration component 138 can allow a user to schedule the retrieval of query results from one or more posting services, such as at a specific time/date, or according to a schedule or at set intervals, such as every night, every week at a particular time, etc.

A controller component or software layer 142 can include a configuration controller 144. The configuration controller 144 can interact with the posting service configuration component 136 to create, store, update, or delete profiles for a posting service 108. In turn, the configuration controller 144 can call a mapping service 150 of a service software layer 148, which can create mapping objects (or entities, which can be tables, or entries in tables, in a database 156, or other data store) 152 (i.e., query results schema mapping objects, or schema mapping objects) that can be stored by a persistence layer 154 (such as in the database).

A data transfer controller 158 of the controller component 142 can communicate with a data transfer service 160. In response to calls by the data transfer controller 158, the data transfer service 160 can issue requests to pull query results (e.g., query results in the second format 130, as returned by the API 126) from the posting services 108. Responses from the posting services 108 can be received by a query results parser 162 of the service layer 148. The query results parser 162 can retrieve mapping objects 152 through the mapping service 150. Using the appropriate mapping object 152 for a given posting service 108, the parser 162 can extra data elements from query results. For example, the parser 162 can extract values for various metadata elements from the query results and produce a query results object 164 that can be sent to the application 110.

In some cases, the parser 162 can directly convert from a query results format provided by a posting service 108 to a query results object 164. In other cases, the parser 162 can convert query results provided by a posting service 108 to a query results object 164 by first generating a representation of the query results in an intermediate format (not shown). The intermediate format can be a generalized format that can be used for query results from any of the posting services 108. Query results in the generalized, or intermediate, format can then be mapped to a format used for the query results object 164.

In order to assist the application 110 in correlating query results provided in a query results object 164 to a particular query, it can be useful for the posting service adapter 112 to map identifiers for the queries in the first format 118 to identifiers used in the queries in the second format 128. Accordingly, a query mapping API 166 of the posting service adapter 112 can receive query identifiers from the application 110. In a specific use case, when the posting component 122 of the application 110 posts a query to a posting service 108, the posting component 122 receives the value of the identifier of the query in the second format 128. The application 110 can then call the query mapping API 166, sending the identifier of the query in the first format 118 and the identifier of the query in the second format 128.

The API 166 can send the query identifiers to a query mapping service 168 of the service layer 148. The identifiers can be sent as a pair including the identifier for the query in the first format 118 and a single query in the second format 128 for a single posting, as a tuple including the identifier for the query in the first format and identifiers for multiple queries in the second format (e.g., corresponding to the same query from the application 110, but at different posting services 108), or as larger or more complex data collections (e.g., a series of tuples/records for multiple postings by the application, to one, or optionally a plurality, of the posting services).

The query mapping service 168 can produce query mapping objects 170. A query mapping object 170 can be used to assign the identifier of the query in the first format 118 to a query results object 164. Query mapping objects 170 can be persisted by the persistence layer 154, such as to the database 156. In a particular example, query mapping objects 170 can be represented as records in one or more database tables (for example, a table that has an attribute for "first format query identifier" and an attribute for "second format query identifier").

An application transfer service 174 can transfer query results, such as using query result objects 164, to the application 110, where the query results can be stored as the query results in the second format 120. In a particular example, the application transfer service 174 can use a web-based protocol, including protocols that comply with REST principles. In a more particular example, the application transfer service 174 can transfer information in query results objects 164 to the application 110 using the ODATA protocol.

Example 3—Example User Interface Screen for Metadata Schema Mapping

As described in Example 2, query results (e.g., responses to a posting) can be provided in a different format than a format used by an application which requested the posting. In general, different applications may use different formats, and the present disclosure provides technologies for converting between such formats.

Typically, a format for query results includes a plurality of metadata fields, to which one or more values may be assigned. However, not all formats need include all possible fields, and fields can be named and ordered or grouped (including hierarchically) differently between formats. Similarly, for otherwise equivalent metadata elements, a metadata element in one format may have a different datatype than the equivalent metadata element in another format.

Figure 2:
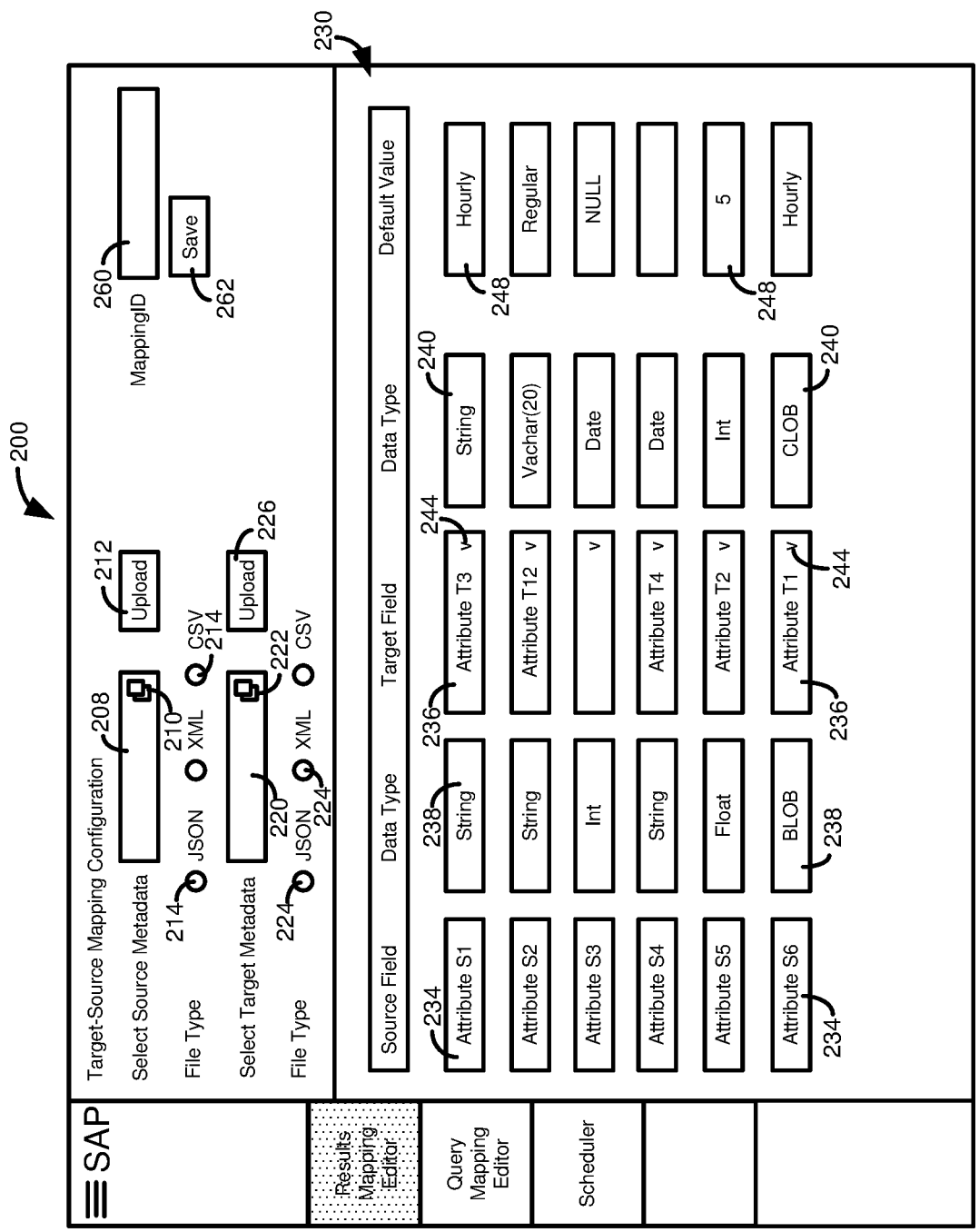
FIG. 2 is an example user interface screen allowing a user to map elements of a first schema for query results to a second schema for query results.

FIG. 2 is an example user interface screen 200 that can allow a user to map a first query results format to a second query results format. The user interface screen 200 can be provided by the user interface 134 of FIG. 1, such as corresponding to at least a portion of the posting service configuration component 136. The screen 200 can include a field 208 allowing a user to select a source metadata source (e.g., a source file or data object). A user can browse for a source metadata source by selecting a control 210, and can choose to upload (or otherwise load) the source metadata source using button 212. In at least some cases, source metadata sources can be in different formats or types, and radio buttons 214 can allow a user to specify a source type (e.g., a source format, such as an encoding format, for example JSON or XML). A source format can be a format used by an application that will process query results, such as query results in the first format 120 as used by the application 110 of FIG. 1.

In a similar manner, a field 220 can allow a user to select a target metadata source, including browsing for a source using a control 222. Radio buttons 224 can allow a user to select a file, or format, type for the target metadata source, data from which can be uploaded to the screen 200 by selecting an upload icon 226.

Although the screen 200 is shown with the fields 208, 220 for a user to select source and target metadata sources, in some cases, one or both of these fields can be omitted. For example, a user may manually enter schema information in the screen 200.

A mapping section 230 of the screen 200 can present fields 234 for elements (or attributes) of the source data schema and fields 236 for elements (or attributes) of the target data schema. In a particular implementation, elements from an uploaded metadata schema (e.g., selected using the field 208) are populated to the fields 234. FIG. 2 also shows fields 238 that provide the datatype for a respective field 234, and fields 240 that provide the datatype for a respective field 236. A software component, such as the parser 162, can include logic for converting between datatypes used by the target metadata format and the source metadata format.

The fields 236 can include dropdown selectors 244, which can be used to select from elements read from a target metadata source, such as a target metadata source provided in the field 220. That is, the elements of the target metadata source can define the options from which a user may select using the dropdown selectors 244. Typically, application logic is provided such that a given element of the target metadata source can only be assigned or mapped to a single element (e.g., field 234) of the source metadata.

In some cases, a user can elect to enter a default value for a given source element/target element mapping (e.g., a row of the mapping section 230) in a corresponding default value field 248. The default value can be a value that will be assigned to the corresponding source element 234 if a value is not received from query results having the target metadata schema, or if the target metadata schema does not include an equivalent element that can be mapped to the source metadata schema (or a target metadata element is otherwise not mapped to a given source metadata element).

There need not be, in all cases, an exact correspondence between fields of the source metadata and fields of the target metadata. That is, one or both metadata schemas can have one or more elements that are not present in the other. Typically, if the target metadata schema contains elements that are not present in the source metadata schema, those target metadata elements are simply not mapped to, or otherwise included in or accounted for in, the source metadata (i.e., it can be presumed that the application 110 does not "care" about those metadata elements). If the source metadata includes metadata elements that do not have a corresponding target metadata element, the application 110 may include logic for handling such omitted information (including for simply ignoring its absence). Or, as described above, a user can enter default values for unmapped source elements 234 in a corresponding default value field 248.

Once a mapping is completed, it can optionally be assigned an identifier using a field 260 and then saved if a user selects a save icon 262. Typically, the identifier provided in the field 260 can be used to associate the mapping with a particular posting service (e.g., a particular posting service 108). Optionally, the mapping may be associated with other information, such as information identifying the application 110 (or a computing system on which the application is executing, a particular user, a particular query type, combinations of these data elements, etc.). In other cases, an identifier can be associated with the mapping in another manner, such as automatically by the posting service configuration component 136 or the configuration controller 144. Typically, the mapping is associated with an identifier that allows the mapping to be associated with a particular posting service (and optionally one or more of the features noted above, such as an identifier of the application 110, a user identifier, etc.).

Example 4—Example User Interface Screen Displaying Query Identifier Mappings

Figure 3:
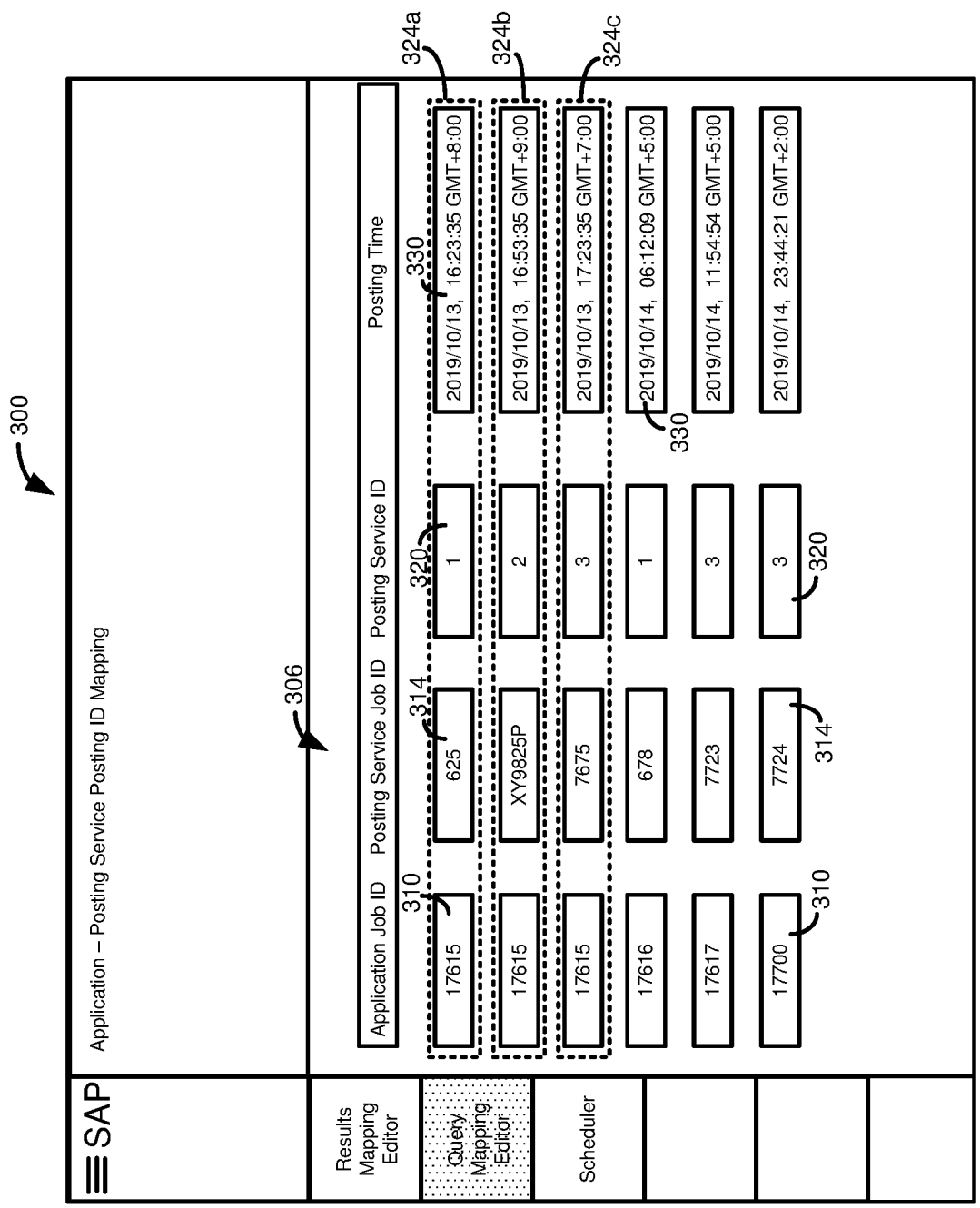
FIG. 3 is an example user interface screen displaying mappings of query identifiers used by a posting service to query identifiers used by an application system.

FIG. 3 illustrates a user interface screen 300 that can allow a user to view, and optionally take various actions regarding, queries posted to a posting service. The user interface screen 300 can be provided by the data transfer configuration component 138 of the user interface 134 of FIG. 1.

The screen 300 includes a table 306 having a column with fields 310 providing an identifier used by an application associated with a posting or query, such as the application 110. The table 306 further includes a column with fields 314 providing an identifier used by a posting service (e.g., a posting service 108), where a row of the table thus provides a tuple that associates a given posting identifier for a posting service in a field 314 with a corresponding posting identifier for an application in the field 310. Note that a given application posting identifier in a field 310 can be appear in multiple rows, having different identifiers for different posting services in a column having fields 320. That is, for example, rows 324a, 324b, 324c have the same value in field 310, but different values in the field 314, where the value in field 320 identifies a particular posting service to which the query was posted. Each row can also be associated with a posting time, in a column having fields 330.

In some cases, rows of the table 306 can be selectable, or a user otherwise enabled to select a particular tuple of the table, where selection of a tuple causes query results for the tuple to be retrieved. In at least some cases, a posting service adapter of the present disclosure, such as the posting service adapter 112 of FIG. 1, can be configured to maintain identifiers for individual query results received from posting services 108. That is, query results can be in the form of discrete results, or responses to a posting, having unique identifiers, even if multiple responses are included in a single communication from a posting service. These query response identifiers can be stored. When query results are received from a posting service, a component of the posting service adapter (such as the parser 162) can determine whether any of the query results were previously received by the posting service adapter, and returned to the application 110. If so, those query results can be omitted from further processing, including not being sent (again) to the application 110. In this way, the posting service adapter 112 can avoid sending duplicative query results to the application, which can conserve processing resources at the posting service adapter 112, and network resources in transferring query results from the posting service adapter to the application 110.

Although FIG. 3 has been described as providing for manually-triggered retrieval of query results, in at least some implementations disclosed technologies can provide for automatically triggered or scheduled retrieval of query results, in addition to, or in place of, manual retrieval. Scheduling can include retrieving results at one or more specified times, or according to a schedule, such as at particular intervals (e.g., daily, weekly). Typically results are "pulled" from a posting service 108, but the posting service adapter 112 can be configured to respond to "push" requests from a posting service, if supported by a given posting service.

Example 5—Example Application of Disclosed Technologies to Recruiting Scenario

Recruiting is a particular area in which the technologies discussed in Examples 1-4 may find use. While there are many ways of recruiting, a common way is for hiring personnel of a particular entity to post job openings to one or more job boards. The hiring personnel can use software applications that are particularly designed for recruiting activities, such as the SAP SuccessFactors product of SAP SE, of Walldorf, Germany.

Recruiting software may include functionality to post a particular job to multiple job boards (e.g., posting services 108 of FIG. 1). The recruiting software may have functionality to convert a given job posting to a format used by a job board, and to call APIs of the posting service to post the job. However, typically the hiring personnel must manually log onto a job board to determine whether any candidates have applied. If candidates have applied, the hiring personnel may review candidate information and enter that information back in the recruiting software used by the entity. This process can be time consuming and error prone.

Using technologies described in the present disclosure, hiring personnel, or other users, can configure a posting service adapter (such as the posting service adapter 112 of FIG. 1) to map candidate profiles as maintained in their recruiting software to candidate profiles as provided by a posting service. The hiring personnel can then manually cause candidate profiles to be retrieved from the posting services, converted to the format used by the recruiting software, and sent to the recruiting software. Or, automatic retrieval of candidate profiles can be scheduled, or triggers set.

Candidate profiles provided by a job board can be associated with a particular metadata schema, which can be hierarchically organized. For example, a candidate profile will typically contain elements such as a candidate's name, social security number, date of birth, address and other contact information, work history, and educational history. Some of these elements, such as work history and educational history, may have sub-elements such as company or school name, dates employed or school attended, employer or school address or contact information, etc. These metadata elements may have different names, organizations, datatypes, or combinations thereof, than a schema used by the recruiting software. Mapping between a job board and the recruiting software can include mapping metadata elements from one schema to metadata elements of the other schema, and optionally converting between datatypes used in the different schemas.

Candidate profiles may be provided in different encoding or file formats, such as being sent by a posting service in XML or JSON. However, the recruiting software may be configured to use candidate profiles in another format, such as instances of an abstract datatype or an object in an object oriented programming language. A posting service adapter, used in the recruiting context, can convert candidate profiles from an XML or JSON representation to an intermediate format used by the posting service adapter. The intermediate representation can be an instance of a class or object defined to represent a candidate profile. This intermediate format can then be converted for use by, or for sending to, the recruiting software, where the profiles can be instantiated as instances of the class/object of the recruiting system.

FIGS. 4-6 illustrate how query results, in the form of candidate profiles by job boards in response to a job posting, can be converted from a format provided by the job board, to an intermediate format, and then to a format used by recruiting software. FIGS. 4A-4F present XML code for a partially completed candidate profile 400. The profile 400 includes a plurality of hierarchically arranged metadata elements 404. Values 408 are provided for a portion of the metadata elements. The profile 400 can represent candidate profiles provided by a first job board in response to a job posting.

FIGS. 5A-5H illustrate an alternative XML candidate profile 500 representation as provided by another job board. The candidate profile representation 500 can include multiple candidate profiles 510 that are responsive to a given job posting. As with the profile 400, each profile 510 can include various metadata elements 514, where values 518 are provided for at least some of the metadata elements.

FIG. 6 provides a JSON representation of a candidate profile 600 that can be sent by a job board. The candidate profile 600 includes a plurality of metadata elements 608, at least some of which are associated with values 614, and thus form attribute-value pairs.

A posting service adapter according to the present disclosure can include a parser that retrieves mapping information for a given job board, reads the format in which candidate profiles are provided by a job board (e.g., in XML or JSON), extract values for metadata elements, and uses the mapping information to assign the values to a format to be sent to the recruiting system. In carrying out the extracting and assigning, the parser can also convert values between datatypes, if there is a difference between a datatype used for a metadata element by a job board and the datatype of the element in the format used by the recruiting service.

FIG. 7 presents JAVA source code 700 for a RawCandidate class. The RawCandidate class can represent an intermediate format that can be used to hold data extracted (such as by the parser 162) from candidate profiles received from a job board. The source code 700 defines data members for the RawCandidate class that include a string 708 for an identifier assigned to the profile, an object 710 (e.g. another abstract datatype) that includes the actual applicant information for the candidate, a byte array 712 that can be used to hold an attachment provided by the applicant (e.g., a pdf version of a cover letter or resume), and a string 714 that represents the file type of the byte array. Additional data members can include a string 716 that holds the name of the applicant (candidateName) and a string 718 that holds the job posting identifier for the job opening to which the candidate is applying (which, depending on the implementation, can be the identifier associated with the query in the first format 118 or the identifier associated with the query in the second format 128). The code 700 defines various methods 730, including "setter" and "getting" methods for the various data members.

Note that the object datatype used for the profile data member 710 can be a very general datatype, and can be used to hold XML or JSON data, for example. So, an instance of the RawCandidate class can be used to store basic information regarding a candidate, and hold the candidate's profile (e.g., in a format shown in FIG. 4A-4F, 5A-5H, or 6) in the object abstract datatype where it can be further processed (e.g., by the parser 162) to provide a representation of the candidate that can be sent to the recruiting software.

FIG. 8 presents JAVA source code 800 for a ParsedCandidate class. The ParsedCandidate class can be used to hold information extracted from an instance of the RawCandidate class. The ParsedCandidate class can be a format that can be sent to, and used by, the recruiting software, which can be serialized and sent to the recruiting software (where it can be converted, for example, to a representation, such as an instance of a class, in the format used by the recruiting software), or which can be provided to the recruiting software via an API of the recruiting software (where it can be converted, for example, to a representation, such as an instance of a class, in the format used by the recruiting software). The code 800 includes data members for a profileHeader object 810 (described in the code 900 of FIG. 9), a resumeAttachment object 812 (described in the code 1000 of FIG. 10), and a list 814 of properties for the candidate (where a property is described in the code 1100 of FIG. 11).

The code 800 also declares various methods, including a method 820 to set the values for the profileHeader data member 810 and the resumeAttachment data member 812. A method 824 allows specific properties provided as arguments to be retrieved from the properties data member 814. A method 828 allows new properties to be added to the properties data member 814, such as during parsing of the object 710 of an instance of the RawCandidate class being processed to produce an instance of the ParsedCandidate class. Similarly, a method 832 can allow a list of properties to be added to the properties data member 814.

The code 800 declares a method 836 for getting the profileHeader data member 810, and a method 840 for getting the resumeAttachment data member 812.

Figure 9:
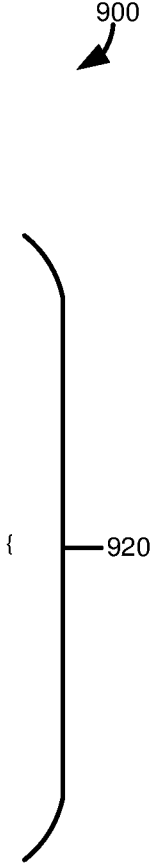

FIG. 9 presents the example JAVA code 900 for the profileHeader abstract datatype. The profileHeader abstract datatype includes a string 910 that holds a job identifier value, which can be a value used by the job board to which the candidate profile was originally posted, and from which the candidate profile was received. A data member 912 having the long datatype can hold another job identifier value, such as the job identifier used by the recruiting software. Thus, the profileHeader abstract datatype includes information sufficient to map a job identifier used by the recruiting software to the corresponding job identifier used by a particular job board. A string 914 can be used to hold the identifier for the particular candidate applying for the job represented by the identifiers 910, 912.

The code 900 can include various methods 920, such as methods to set and get the values for the various data members 910, 912, 914.

Figure 10:

FIG. 10 presents the example JAVA code 1000 for the resumeAttachment abstract datatype. The resumeAttachment can be used to store one or more attachments that may have been provided by a candidate, such as a resume or a cover letter. The resumeAttachment abstract datatype can have a data member 1010, a string that can be a URL for the attachment. A content data member 1012, having the byte array type, can be used to hold the content of the attachment, while a string data member 1014 can be used to store the file name of the attachment. A data member 1016 can have a FileExtension datatype, and can be used to store an identifier of the file type of the attachment whose data is stored in the data member 1012. Methods 1020 can be provided to set and get the values of the data members 1010, 1012, 1014, 1016.

FIG. 11 presents example JAVA code 1100 for the FileExtension datatype, which can be an enumerated datatype, which can include values 1110 for various file type extensions. A data member 1112 can store the value of the extension, as a string. A method 1114 can be used to set the value of the data member 1112, while a method 1116 can be used to get the value of the data member 1112. Methods 1120, 1122 can be used, respectively, to create a hash map of file extensions and string representations of the extension, and return a file extension for a given string input.

Figure 12:

FIG. 12 presents example JAVA code 1200 that defines an interface for a Property. The interface includes a method 1210 that returns a Boolean value indicating which a given instance of Property is a required property, and a method 1212 returns a Boolean value indicating whether a given instance of Property is a navigation property. Methods 1214, 1216, can be used, respectively, to return the identifier, in the form of a string, for a given property, as used in the recruiting software, and a string representing an entity type for the instance of Property.

FIG. 13 presents example JAVA code 1300 for a NavigationProperty class. The NavigationProperty class implements the Property interface of the code 1200 of FIG. 12. The code 1300 defines various data members, including a string 1310 for a property identifier used by the recruiting software, a string 1312 for an entity type, and a string 1314 for a navigation entity type. Boolean data members 1316, 1318 can indicate, respectively whether the instance of NavigationProperty is required, and whether the instance includes multiple properties. A data member 1320 is a list that holds instances of abstract datatypes that implement the Property interface.

The code 1300 includes a method 1330 can be used to set the values of the data members 1310, 1312, 1314, 1318. Methods 1332, 1334, 1336, 1338 override the corresponding methods 1214, 1216, 1210, 1212 of the Property interface provided in the code 1200 of FIG. 12. Method 1342 can be used to set the value of data member 1316 as required. Method 1344 can be used to return the data member 1320, while method 1346 can be used to add instances of abstract datatypes implementing the Property interface to the data member 1320. A method 1348 can be used to obtain the value of the data member 1314, while a method 1350 can be used to obtain the value of the data member 1318.

FIG. 14 illustrates JAVA code 1400 for a SimpleProperty class, and JAVA code 1450 for a SimplePropertyBuilder class. The SimpleProperty class implements the Property interface 1200 of FIG. 12, and includes a string data member 1406 for a property identifier as used in the recruiting software, a data member 1408 of the object datatype to hold a value of an instance of the SimpleProperty class, a string data member 1410 to hold a value of the entity type of the instance, and a Boolean data member 1412 indicating whether the instance is required (e.g., if a candidate profile will be valid if a value corresponding to this data member is not found).

A method 1416 can be used to set the properties of the data members 1406, 1408, 1410, 1412 by taking an instance of the SimplePropertyBuilder class as an argument.

The code 1450 for the SimplePropertyBuilder class includes a string data member 1452 for a property identifier as used in the recruiting software, a data member 1454 of the object datatype and holding a value for the instance, and a string data member 1456 holding an entity type for the instance. The data members 1452, 1454, 1456 are assigned default values of NULL. A Boolean data member 1458 is used to indicate whether the instance is required, and is defaulted to FALSE.

A method 1464 can be used to return an instance of the SimpleProperty class to an initial state—resetting the values of the data members 1452, 1454, 1456 to NULL, and the value of the data member 1458 to FALSE. Methods 1470 can be used to set/get the values of the data members, while the methods 1474 override the methods 1210, 1212, 1214, 1216 of the Property interface of the code 1200 of FIG. 12.

In practice, when query results from a job board are received, profiles for individual candidates are converted to instances of the RawCandidate class described in the code 700 of FIG. 7. The profile data member 710 can be parsed (e.g., using syntax elements of XML or JSON, such as "/" or semicolon delimiters, to identify attributes/values) to extract various values for various properties in the metadata schema used by the job board. The mapping for the job board can be retrieved, and used to assign entity types (e.g., metadata tags from the schema used by the recruiting software) to the values, which types can be included as properties in an instance of the ParsedCandidate class of the code 800 of FIG. 8.

The identifier used by the recruiting software for the job posting to which the candidate is applying can be retrieved from mapping information using the identifier for the job posting used by the relevant job board, and then associated with the ParsedCandidate. The ParsedCandidate then can be sent to the recruiting application, either as the instance of the ParsedCandidate, sending a serialized version of the instance to the application, or sending the information for the ParsedCandidate using an API of the recruiting application.

Figure 15:
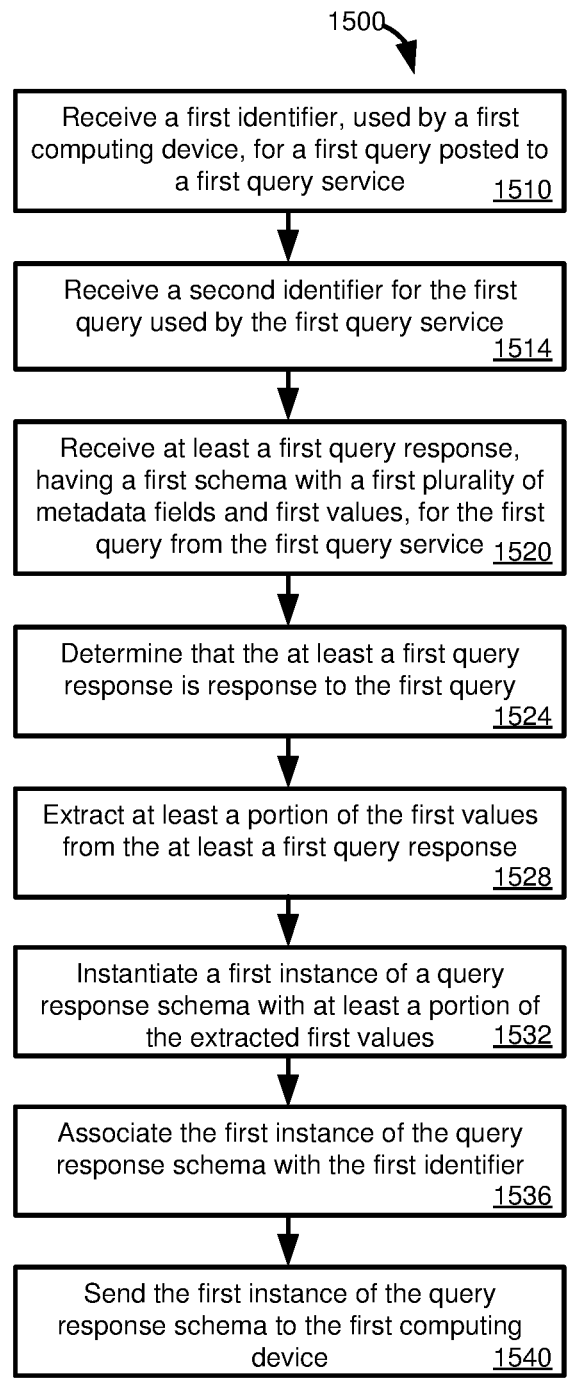
FIGS. 15-17 are flowcharts illustrating operations in disclosed methods of receiving query results, converting query results between formats, and providing converted query results to a computing system that issued the query.

Example 6—Example Operations in Receiving, Converting, and Sending Query Results in Different Schemas FIG. 15 illustrates operations in a method 1500 for retrieving a query result from a query service, converting the result to a format useable by a computing device, and sending the query result to the computing device. The method 1500 can be carried out, in a particular implementation, using the computing environment 100 of FIG. 1.

At 1510, a first identifier is received. The first identifier is used by a first computing device to identify a first query posted to a first query service. A second identifier is received at 1514. The second identifier is used by the first query service to identify the first query. At 1520, at least a first query response for the first query is received from the first query service. The first query response is in a first schema, comprising a first plurality of metadata fields and having first values for at least a portion of the first plurality of metadata fields. It is determined at 1524 that the at least a first query response is responsive to the first query. At 1528, at least a portion of the first values are extracted from the at least a first query response. A first instance of a query response schema is instantiated at 1532 with at least a portion of the extracted first values. The query response schema has a second plurality of metadata fields, where at least a portion of the second plurality of metadata fields differ from at least a portion of the first plurality of metadata fields. At 1536, the first instance of the query response schema is associated with the first identifier. The first instance of the query response schema is sent to the first computing device at 1540.

Figure 16:
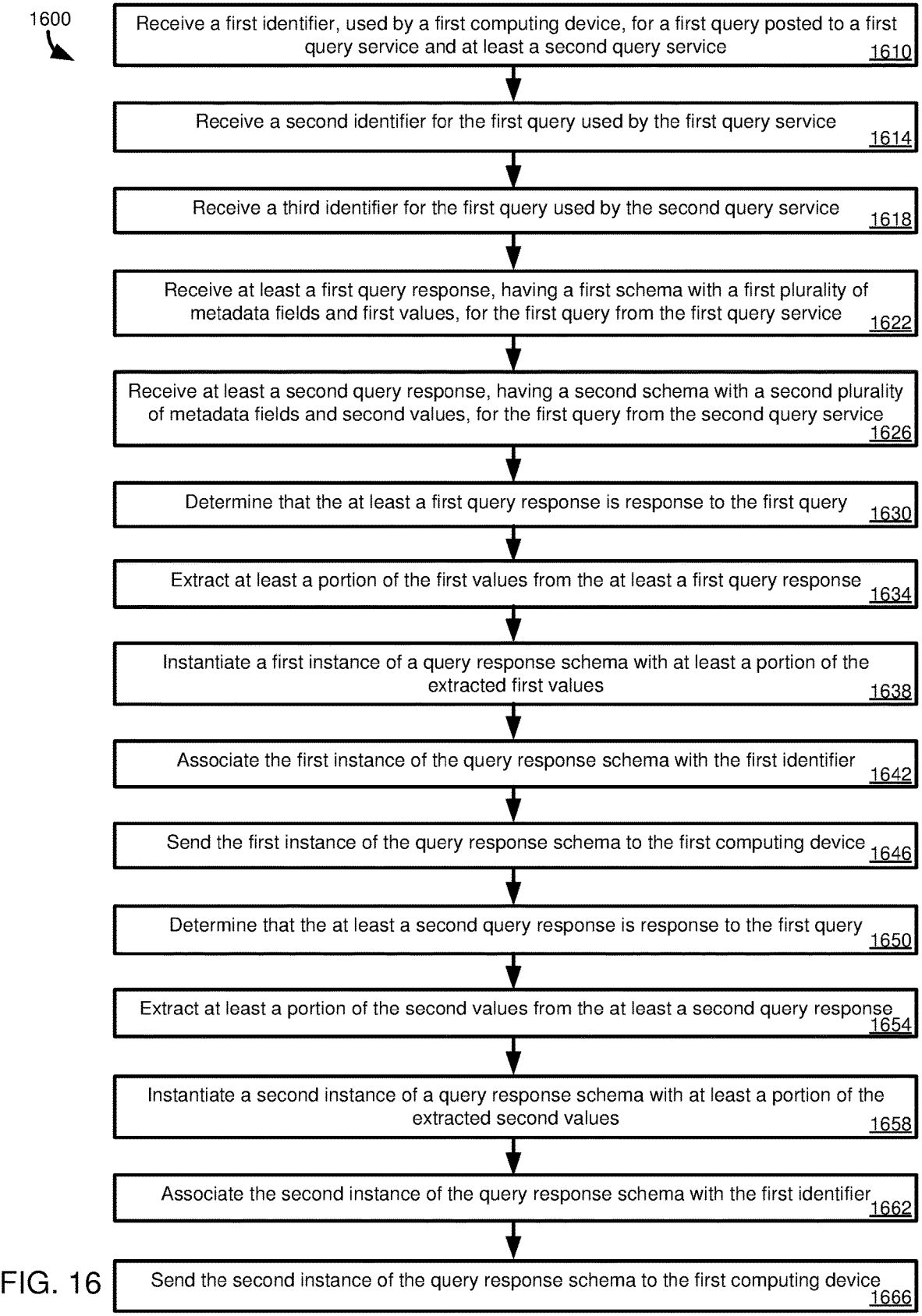

FIG. 16 illustrates operations in a method 1600 for retrieving query results from first and second query services, converting the results to a format useable by a computing device, and sending the query results to the computing device. The method 1600 can be carried out, in a particular implementation, using the computing environment 100 of FIG. 1.

At 1610, a first identifier is received. The first identifier is used by a first computing device to identify a first query posted to a first query service and at least a second query service. A second identifier is received at 1614. The second identifier is used by the first query service to identify the first query. A third identifier is received at 1618. The third identifier is used by the second query service to identify the first query.

At 1622, at least a first query response to the first query is received from the first query service. The at least a first query response has a first schema comprising a first plurality of metadata fields and first values for at least a portion of the first plurality of metadata fields. At 1626, at least a second query response to the first query is received from the second query service. The at least a second query response has a second schema comprising a second plurality of metadata fields and second values for at least a portion of the second plurality of metadata fields. It is determined at 1630 that the at least a first query response is responsive to the first query. At 1634, at least a portion of the first values are extracted from the at least a first query response.

A first instance of a query response schema is instantiated at 1638 with at least a portion of the extracted first values. The query response schema has a third plurality of metadata fields. At least a portion of the third plurality of metadata fields differ from at least a portion of the first plurality of metadata fields. At 1642, the first instance of the query response schema is associated with the first identifier. The first instance of the query response schema is sent at 1646 to the first computing device. At 1650, it is determined that the at least a second query response is responsive to the first query. At least a portion of the second values are extracted at 1654 from the at least a second query response. At 1658, a second instance of the query response schema is instantiated with at least a portion of the extracted second values. The second instance of the query response schema is associated with the first identifier at 1662. At 1666, the second instance of query response schema is sent to the first computing device.

Figure 17:
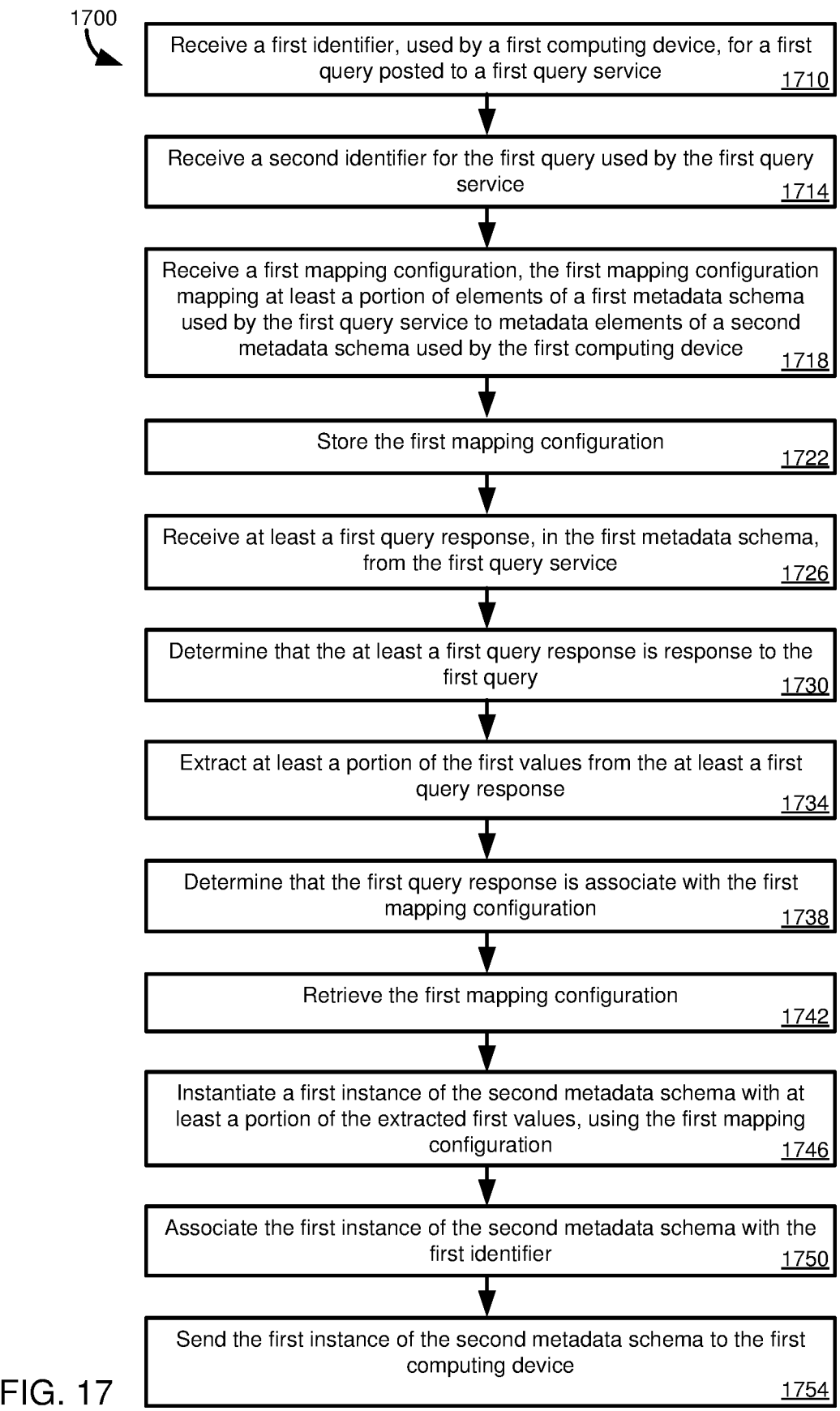

FIG. 17 illustrates operations in a method 1700 for retrieving a query result from a query service, converting the result to a format useable by a first computing device using a mapping configuration, and sending the query result to the first computing device. The method 1700 can be carried out, in a particular implementation, using the computing environment 100 of FIG. 1.

At 1710, a first identifier is received. The first identifier is used by a first computing device to identify a first query posted to a first query service. A second identifier is received at 1714, the second identifier is used by the first query service to identify the first query. At 1718, a first mapping configuration is received. The first mapping configuration maps at least a portion of elements of a first metadata schema used by the first query service to metadata elements of a second metadata schema used by the first computing device. The first mapping configuration is stored at 1722. At 1726, at least a first query response, in the first metadata schema, for the first query is received from the first query service. It is determined at 1730 that the at least a first query response is responsive to the first query. At 1734, at least a portion of first values of metadata elements of the at least a first query response is extracted. It is determined at 1738 that the first query response is associated with the first mapping configuration. The first mapping configuration is retrieved at 1742. At 1746, a first instance of the second metadata schema is instantiated by mapping at least a portion of the first values to metadata elements of the second metadata schema using the first mapping configuration. The first instance of the second metadata schema is associated with the first identifier at 1750. At 1754, the first instance of the second metadata schema is sent to the first computing device.

Example 7—Computing Systems

Figure 18:
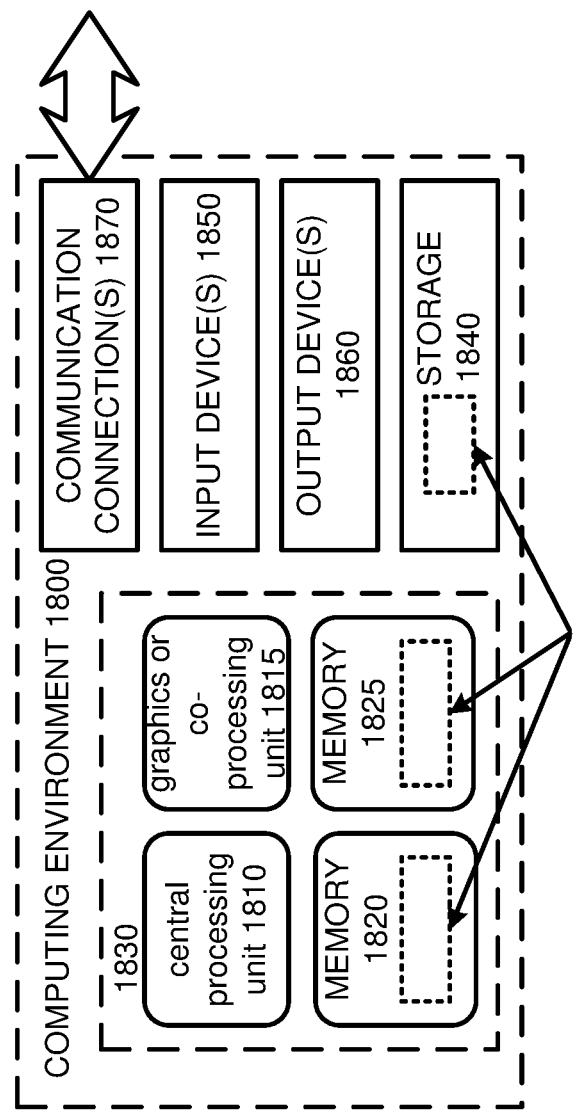
FIG. 18 is a diagram of an example computing system in which some described embodiments can be implemented.

FIG. 18 depicts a generalized example of a suitable computing system 1800 in which the described innovations may be implemented. The computing system 1800 is not intended to suggest any limitation as to scope of use or functionality of the present disclosure, as the innovations may be implemented in diverse general-purpose or special-purpose computing systems.

With reference to FIG. 18, the computing system 1800 includes one or more processing units 1810, 1815 and memory 1820, 1825. In FIG. 18, this basic configuration 1830 is included within a dashed line. The processing units 1810, 1815 execute computer-executable instructions, such as for implementing components of the computing environment 100 of FIG. 1, including as described in Examples 1-6. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 18 shows a central processing unit 1810 as well as a graphics processing unit or co-processing unit 1815. The tangible memory 1820, 1825 may be volatile memory (e.g., registers, cache, RAM), non-volatile memory (e.g., ROM, EEPROM, flash memory, etc.), or some combination of the two, accessible by the processing unit(s) 1810, 1815. The memory 1820, 1825 stores software 1880 implementing one or more innovations described herein, in the form of computer-executable instructions suitable for execution by the processing unit(s) 1810, 1815.

A computing system 1800 may have additional features. For example, the computing system 1800 includes storage 1840, one or more input devices 1850, one or more output devices 1860, and one or more communication connections 1870. An interconnection mechanism (not shown) such as a bus, controller, or network interconnects the components of the computing system 1800. Typically, operating system software (not shown) provides an operating environment for other software executing in the computing system 1800, and coordinates activities of the components of the computing system 1800.

The tangible storage 1840 may be removable or non-removable, and includes magnetic disks, magnetic tapes or cassettes, CD-ROMs, DVDs, or any other medium which can be used to store information in a non-transitory way and which can be accessed within the computing system 1800. The storage 1840 stores instructions for the software 1880 implementing one or more innovations described herein.

The input device(s) 1850 may be a touch input device such as a keyboard, mouse, pen, or trackball, a voice input device, a scanning device, or another device that provides input to the computing system 1800. The output device(s) 1860 may be a display, printer, speaker, CD-writer, or another device that provides output from the computing system 1800.

The communication connection(s) 1870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data-types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8—Cloud Computing Environment

Figure 19:
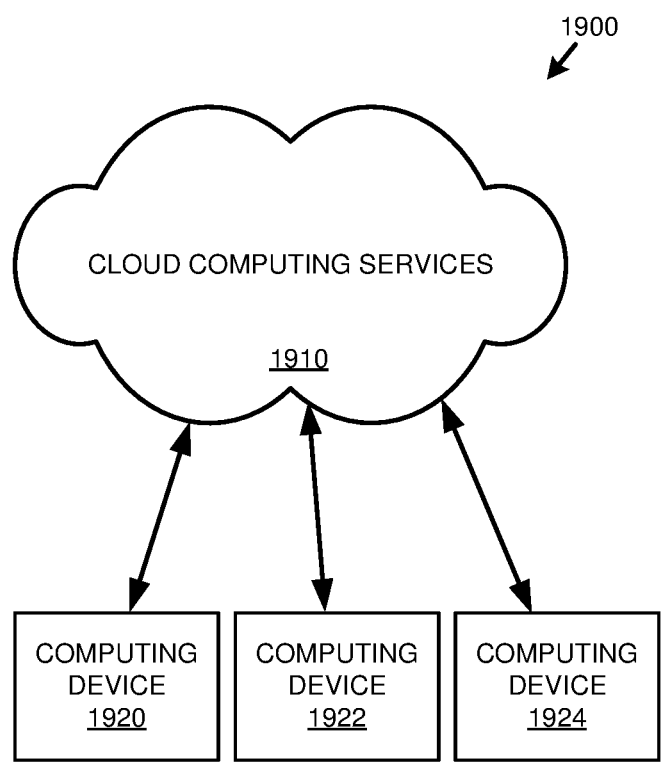
FIG. 19 is an example cloud computing environment that can be used in conjunction with the technologies described herein.

FIG. 19 depicts an example cloud computing environment 1900 in which the described technologies can be implemented. The cloud computing environment 1900 comprises cloud computing services 1910. The cloud computing services 1910 can comprise various types of cloud computing resources, such as computer servers, data storage repositories, networking resources, etc. The cloud computing services 1910 can be centrally located (e.g., provided by a data center of a business or organization) or distributed (e.g., provided by various computing resources located at different locations, such as different data centers and/or located in different cities or countries).

The cloud computing services 1910 are utilized by various types of computing devices (e.g., client computing devices), such as computing devices 1920, 1922, and 1924. For example, the computing devices (e.g., 1920, 1922, and 1924) can be computers (e.g., desktop or laptop computers), mobile devices (e.g., tablet computers or smart phones), or other types of computing devices. For example, the computing devices (e.g., 1920, 1922, and 1924) can utilize the cloud computing services 1910 to perform computing operators (e.g., data processing, data storage, and the like).

Example 9—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 18, computer-readable storage media include memory 1820 and 1825, and storage 1840. The term computer-readable storage media does not include signals and carrier waves. In addition, the term computer-readable storage media does not include communication connections (e.g., 1870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
a memory;
one or more processing units coupled to the memory; and
one or more non-transitory computer readable storage media storing instructions that, when executed, cause the computing system to perform operations comprising:
receiving a first query identifier, used by a first computing device, for a first query;
posting the first query to a first query service;
in response to the posting, receiving a second query identifier, used by the first query service for the first query;
receiving at least a first query response for the first query from the first query service, the at least the first query response having a first schema comprising a first plurality of metadata fields and first values for at least a portion of the first plurality of metadata fields;
receiving and storing a first mapping configuration mapping at least a portion of the first schema used by the first query service to at least a portion of a query response schema used by the first computing device;
based at least in part on determining that the at least the first query response is responsive to the first query at least in part using the second query identifier, extracting at least a portion of the first values from the at least the first query response to provide extracted first values;
based at least in part on determining that the first query response is associated with the first mapping configuration, retrieving the first mapping configuration to provide a retrieved first mapping configuration;
instantiating, using the retrieved first mapping configuration, a first instance of the query response schema with at least a portion of the extracted first values, the query response schema having a second plurality of metadata fields, at least a portion of the second plurality of metadata fields differing from at least a portion of the first plurality of metadata fields;
associating the first instance of the query response schema with the first query identifier; and
sending the first instance of the query response schema to the first computing device.

2. The computing system of claim 1, wherein the operations further comprise:
sending a request to the first query service for query responses responsive to the first query, the request comprising the second query identifier.

3. The computing system of claim 2, wherein the request is sent responsive to user input to retrieve query results.

4. The computing system of claim 2, wherein the request is sent based at least in part on a schedule set for retrieving query results.

5. The computing system of claim 1, wherein the first query is also posted to a second query service and the operations further comprise:

receiving a third query identifier, used by the second query service for the first query;
receiving at least a second query response for the first query from the second query service.

6. The computing system of claim 5, wherein the at least the second query response has a second schema comprising a third plurality of metadata fields and second values for at least a portion of the third plurality of metadata fields, the operations further comprising:
based at least in part on determining that the at least the second query response is responsive to the first query extracting at least a portion of the second values from the at least the second query response to provide extracted second values;
instantiating a second instance of the query response schema with at least a portion of the extracted second values;
associating the second instance of the query response schema with the first query identifier; and
sending the second instance of the query response schema to the first computing device.

7. The computing system of claim 6, wherein the at least the first query response and the at least the second query response are encoded in different formats.

8. The computing system of claim 7, wherein the at least the first query response is in XML and the at least the second query response is in JSON.

9. The computing system of claim 1, wherein the instantiating the first instance of the query response schema uses the first mapping configuration mapping at least a portion of the first plurality of metadata fields to at least a portion of the second metadata fields.

10. The computing system of claim 9, the operations further comprising:
receiving user input defining the first mapping configuration, the first mapping configuration being associated with the first query service.

11. The computing system of claim 10, the operations further comprising:
receiving user input defining a second mapping configuration mapping a metadata schema associated with a second query service to the query response schema.

12. The computing system of claim 11, the operations further comprising:
determining that the at least the first query response is from the first query service; and
based at least in part on the determining that the at least the first query response is from the first query service, selecting the first mapping configuration, rather than the second mapping configuration, for use in the instantiating.

13. The computing system of claim 12, the operations further comprising:
receiving a request to retrieve query results for the first query;
based at least in part on determining that the first query is posted to the first query service and is posted to the second query service;
sending a first request for the query results for the first query to the first query service; and
sending a second request for the query results for the first query to the second query service.

14. The computing system of claim 10, the operations further comprising:
storing a first query ID mapping comprising the first query identifier and the second query identifier;

receiving from the first computing device a request to retrieve query results for the first query, the request comprising the first query identifier;

using the first query identifier, retrieving the first query ID mapping to provide a retrieved query ID mapping; and sending a request to the first query service for the query results for the first query, the request to the first query service comprising the second query identifier, as determined from the retrieved query ID mapping.

15. The computing system of claim 1, the operations further comprising:

storing a first mapping service configuration, the first mapping service configuration comprising an identifier of at least one Application Programming Interface (API) of the first mapping service that receives call to retrieve query results;

receiving a request to retrieve query results from the first query service;

retrieving the first mapping service configuration; and calling the at least one API.

16. The computing system of claim 1, wherein the extracting comprises storing at least a portion of the first query response in an intermediate representation, and wherein the instantiating the first instance of a query response schema comprises parsing the at least the portion of the first query response in the intermediate representation.

17. The computing system of claim 16, wherein the intermediate representation is an instance of an abstract datatype having a data member for storing the at least the portion of the first query response.

18. A method, implemented in a computing system comprising a memory and one or more processors, comprising:

receiving a first query identifier, used by a first computing device, for a first query;

posting the first query to a first query service and at least a second query service;

in response to the posting, receiving a second query identifier, used by the first query service for the first query, and receiving a third query identifier, used by the second query service for the first query;

receiving at least a first query response for the first query from the first query service, the at least the first query response having a first schema comprising a first plurality of metadata fields and first values for at least a portion of the first plurality of metadata fields;

receiving at least a second query response for the first query from the second query service, the at least the second query response having a second schema comprising a second plurality of metadata fields and second values for at least a portion of the second plurality of metadata fields;

receiving and storing a first mapping configuration and a second mapping configuration, wherein the first mapping configuration maps at least a first portion of the first schema used by the first query service to at least a first portion of a query response schema used by the first computing device, and the second mapping configuration maps at least a second portion of the second schema used by the second query service to the at least a second portion of the query response schema used by the first computing device, wherein the at least a first portion of the request response schema and the at least a second portion of the query response schema are the same or differ in whole or part:

based at least in part on determining that the at least first query response is responsive to the first query at least in part using the second query identifier, extracting at least a portion of the first values from the at least first query response;

based at least in part on determining that the first query response is associated with the first mapping configuration, retrieving the first mapping configuration to provide a retrieved first mapping configuration;

instantiating, using the retrieved first mapping configuration, a first instance of the query response schema with at least a portion of the extracted first values, the query response schema having a third plurality of metadata fields, at least a portion of the third plurality of metadata fields differing from at least a portion of the first plurality of metadata fields;

associating the first instance of the query response schema with the first query identifier;

sending the first instance of the query response schema to the first computing device;

based at least in part on determining that the at least second query response is responsive to the first query at least in part using the third query identifier, extracting at least a portion of the second values from the at least second query response;

based at least in part on determining that the at least second query response is associated with the second mapping configuration, retrieving the second mapping configuration to provide a retrieved second mapping configuration;

instantiating, using the retrieved second mapping configuration, a second instance of the query response schema with at least a portion of the extracted second values;

associating the second instance of the query response schema with the first query identifier; and sending the second instance of the query response schema to the first computing device.

19. The method of claim 17, wherein the at least a first portion of the request response schema and the at least a second portion of the query response schema are the same.

20. One or more non-transitory computer-readable storage media storing:

computer-executable instructions that, when executed by a computing system comprising at least one hardware processor and at least one memory coupled to the at least one hardware processor, cause the computing system to receive a first query identifier, used by a first computing device, for a first query;

computer-executable instructions that, when executed by the computing system, cause the computing system to post the first query to a first query service;

computer-executable instructions that, when executed by the computing system, cause the computing system to, in response to the posting, receive a second query identifier, used by the first query service for the first query;

computer-executable instructions that, when executed by the computing system, cause the computing system to receive a first mapping configuration, the first mapping configuration mapping at least a portion of metadata elements of a first metadata schema used by the first query service to metadata elements of a second metadata schema used by the first computing device;

computer-executable instructions that, when executed by the computing system, cause the computing system to store the first mapping configuration;

computer-executable instructions that, when executed by the computing system, cause the computing system to receive at least a first query response for the first query from the first query service, the at least first query response being in the first metadata schema;

computer-executable instructions that, when executed by the computing system, cause the computing system to, based at least in part on determining that the at least first query response is responsive to the first query at least in part using the second query identifier, extract at least a portion of first values from the metadata elements of the at least the first query response;

computer-executable instructions that, when executed by the computing system, cause the computing system to, based at least in part on determining that the at least first query response is associated with the first mapping configuration, retrieve the first mapping configuration to provide a retrieved first mapping configuration;

computer-executable instructions that, when executed by the computing system, cause the computing system to instantiate a first instance of the second metadata schema with at least a portion of the extracted first value by mapping at least a portion of the first values to the metadata elements of the second metadata schema using the retrieved first mapping configuration;

computer-executable instructions that, when executed by the computing system, cause the computing system to associate the first instance of second metadata schema with the first query identifier; and computer-executable instructions that, when executed by the computing system, cause the computing system to send the first instance of the second metadata schema to the first computing device.

* * * * *